(12) United States Patent
Buerger et al.

(10) Patent No.: US 10,144,464 B1
(45) Date of Patent: Dec. 4, 2018

(54) ENERGY EFFICIENT ROBOT

(71) Applicant: National Technology & Engineering Solutions of Sandia, LLC, Albuquerque, NM (US)

(72) Inventors: Stephen Buerger, Albuquerque, NM (US); Clinton G. Hobart, Albuquerque, NM (US); Curt M. Salisbury, San Ramon, CA (US); Steven J. Spencer, Albuquerque, NM (US); Anirban Mazumdar, Albuquerque, NM (US); Michael Kuehl, Albuquerque, NM (US); Kevin J. Dullea, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 707 days.

(21) Appl. No.: 14/794,666

(22) Filed: Jul. 8, 2015

Related U.S. Application Data

(60) Provisional application No. 62/022,817, filed on Jul. 10, 2014.

(51) Int. Cl.
| | | |
|---|---|---|
| *B62D 57/032* | (2006.01) | |
| *F16H 9/02* | (2006.01) | |
| *B25J 17/02* | (2006.01) | |
| *F16H 9/10* | (2006.01) | |
| *F16H 9/06* | (2006.01) | |
| *F16H 9/04* | (2006.01) | |
| *F16H 9/12* | (2006.01) | |
| *B25J 9/10* | (2006.01) | |
| *F16H 7/02* | (2006.01) | |
| *F16H 7/10* | (2006.01) | |

(52) U.S. Cl.
CPC ........ *B62D 57/032* (2013.01); *B25J 17/0266* (2013.01); *F16H 9/02* (2013.01); *F16H 9/04* (2013.01); *F16H 9/06* (2013.01); *F16H 9/10* (2013.01); *F16H 9/12* (2013.01); *B25J 9/104* (2013.01); *B25J 9/106* (2013.01); *F16H 7/02* (2013.01); *F16H 7/023* (2013.01); *F16H 7/10* (2013.01)

(58) Field of Classification Search
CPC . B62D 57/032; F16H 9/02; F16H 9/04; F16H 9/06; F16H 9/10; F16H 9/12; F16H 7/02; F16H 7/023; F16H 7/10; B25J 17/0266; B25J 9/104; B25J 9/106
See application file for complete search history.

(56) References Cited

U.S. PATENT DOCUMENTS

| | | | | |
|---|---|---|---|---|
| 5,207,114 A | * | 5/1993 | Salisbury, Jr. | ........... B25J 9/046 414/7 |
| 7,441,614 B2 | * | 10/2008 | Takemura | ............ B25J 17/0283 180/8.1 |
| 7,658,246 B2 | * | 2/2010 | Takenaka | ............. B25J 19/0012 180/8.6 |
| 8,327,959 B2 | * | 12/2012 | Lee | ........................ A63H 11/00 180/8.6 |

(Continued)

*Primary Examiner* — Paul N Dickson
*Assistant Examiner* — Marlon A Arce
(74) *Attorney, Agent, or Firm* — Daniel J. Jenkins

(57) ABSTRACT

A locomotion subassembly for a biped robot is disclosed. The locomotion subassembly includes several unique energy transfer mechanisms and arrangements for efficiently powering the motion of the robot.

20 Claims, 27 Drawing Sheets

(56) References Cited

U.S. PATENT DOCUMENTS

| | | | | |
|---|---|---|---|---|
| 8,387,726 B2* | 3/2013 | Miyazaki | ............... | A63H 11/00 |
| | | | | 180/8.6 |
| 8,709,000 B2* | 4/2014 | Madhani | .......... | A61B 17/00234 |
| | | | | 606/1 |
| 9,097,325 B2* | 8/2015 | Zhu | .......................... | B25J 9/104 |
| 9,568,074 B2* | 2/2017 | Gosselin | .................. | B25J 9/102 |
| 2012/0271207 A1* | 10/2012 | Schoen | ................. | A61F 5/0102 |
| | | | | 601/34 |
| 2013/0090194 A1* | 4/2013 | Ferlay | ..................... | B25J 9/104 |
| | | | | 474/64 |
| 2017/0038189 A1* | 2/2017 | Jordil | .................... | B25J 9/1035 |

* cited by examiner

ENERGY EFFICIENT ROBOT

RELATED APPLICATIONS

This invention claims the benefit of U.S. Provisional Patent Application No. 62/022,817, filed Jul. 10, 2014, entitled "Energy Efficient Locomotion in Legged Robotics," the contents of which are herein incorporated by reference in its entirety.

GOVERNMENT RIGHTS

The Government has rights to this invention pursuant to Contract No. DE-AC04-94AL85000 awarded by the U.S. Department of Energy.

FIELD

The invention relates generally to robot locomotion, and more particularly to energy efficient humanoid biped robot locomotion.

BACKGROUND OF THE INVENTION

Humanoid bipedal robots have been known in general as basically human-shaped robots. Like human beings, they have two legs extending from a hip at the lower end of an upper body (torso), and may have two arms extending from shoulders on the left and right opposite sides of the upper body. These humanoid robots maintain balance by having large feet and actively controlling their body posture. By adjusting the posture, they position their center directly above the foot touching the ground to achieve stability. This is made easier with large feet that provide large contact areas with the ground. In most embodiments, such robots rely on inertial sensing to actively control the location of the center of gravity and maintain it above the feet.

Such balancing control strategies provide static stability, i.e. the robot maintains its balance throughout its walking gait. Its movement can be interrupted at any time without loss of stability. One example is the zero moment point (ZMP) strategy, commonly used in humanoids. Alternatively, other approaches to bipedal locomotion use dynamic stability, in which the robot may transition through a series of stable states, passing through periods of instability during transitions between states. Conventional biped robots have multiple electric or hydraulic motors installed in their legs, such as at the hip, knee and ankle. Consecutive segments of the leg are typically connected by motor-gear articulations that enable motions of these segments one relative to the other. The coordinated actuation of these articulations makes the leg describe specific trajectories and generate locomotion gaits. High level locomotive control may be based on either motion or torque/force. If based on motion, actuation of the motor-gear articulations creates specific motion trajectories that generate locomotion gaits. If based on torque/force, joint-level motor-gear articulations are driven with particular output torque or force trajectories, which interact with body dynamics and the environment (e.g. the ground) to produce the desired stable progression of the robot's center of mass.

The limitations of conventional biped design are twofold. A first limitation of conventional biped design is that conventional drive system designs used for walking robots are not power efficient. Significant energy is lost due to friction, excessive acceleration of drivetrain elements, and inefficient conversion between physical domains (e.g. electrical to mechanical or electrical to hydraulic to mechanical) in the actuators. In conventional designs, friction consumes energy in the actuators (e.g. hydraulic, pneumatic, or electric), transmissions, or joints. Large gear ratios (e.g. 50:1 or greater) are commonly used, and this requires very large accelerations of the actuators and elements of the transmissions that are upstream of the gear reduction whenever the joint speed changes (which happens almost constantly during walking); these internal accelerations require large actuator torques. Much energy is typically also lost in the conversion of source energy (e.g. electrical energy from a battery) to mechanical work done on the joints. For example, typical servo-hydraulic actuators are extremely inefficient at high-speed, low-torque conditions; electromagnetic motors are extremely inefficient at high-torque, low-speed conditions. The result of inefficiencies in the drive systems of conventional biped designs is that such robots are typically unable to traverse large distances or walk for long periods of time with the amount of energy that they are able to carry, e.g. in a battery. This limits the utility of bipeds for realistic applications in which they will be required to operate for long periods of time and at large standoff distances without the opportunity to recharge or replace batteries.

A second limitation of conventional biped design is that most conventional drive systems have high intrinsic mechanical impedance (mechanical impedance is the frequency dependent ratio of force or torque in response to a velocity applied at the output), meaning that they are intrinsically ineffective at applying controlled torque or force, which is required for the most efficient dynamic walking strategies. To achieve adequate torque control requires elaborate sensors and computation, and this approach is fundamentally vulnerable to contact instabilities and other performance limitations.

A need remains, therefore, for a humanoid biped robot that is able to power efficiently traverse long distances and operate for long periods of time under power from a source (e.g. a battery) that it can carry, reserving enough energy to perform manipulation or other activities required to complete relevant tasks. Secondarily, there is a need for a humanoid biped robot that achieves high-quality, highly-stable torque control and is able to stably implement the most aggressive, highest-performing and most-energy efficient emerging locomotion behavior algorithms.

SUMMARY OF THE INVENTION

The present disclosure is directed to a bipedal robot that achieves high-quality torque control in all leg joints without using torque feedback.

An embodiment of the present disclosure is directed to a robot including a locomotion subassembly including at least one speed reducing transmission system. The speed reducing transmission system includes a bobbin coupled to a motor, a pulley, a first cable coupling the bobbin to the pulley such that when the bobbin is rotated, the first cable rotates the pulley in a first direction, and a second cable coupling the bobbin to the pulley, such that when the bobbin is rotated, the second cable rotates the pulley in an second direction opposite the rotation in the first direction urged by the first cable. The bobbin includes grooves for winding the first and second cables thereupon.

Another embodiment of the present disclosure is directed to a robot including a locomotion subassembly including a 4-bar transmission subassembly. The 4-bar transmission subassembly includes a drive pulley, an output rotating link coupled to the drive pulley, an intermediate rotating link coupled to the output rotating link, an input rotating link coupled to the intermediate rotating link, and a pulley subassembly coupled to the input rotating link. The pulley subassembly is coupled to a speed reducing transmission system.

Another embodiment of the present disclosure is directed to a speed reducing transmission system including a bobbin coupled to a motor, a pulley, a first cable coupling the bobbin to the pulley such that when the bobbin is rotated, the first cable rotates the pulley in a first direction, and a second cable coupling the bobbin the pulley, such that when the bobbin is rotated, the second cable rotates the pulley in an second direction opposite the rotation in the first direction urged by the first cable. The bobbin comprises grooves for winding the first and second cables thereupon.

BRIEF DESCRIPTION OF THE FIGURES

Wherever possible, the same reference numbers will be used throughout the drawings to represent the same parts.

DETAILED DESCRIPTION OF THE INVENTION

Figure 1:
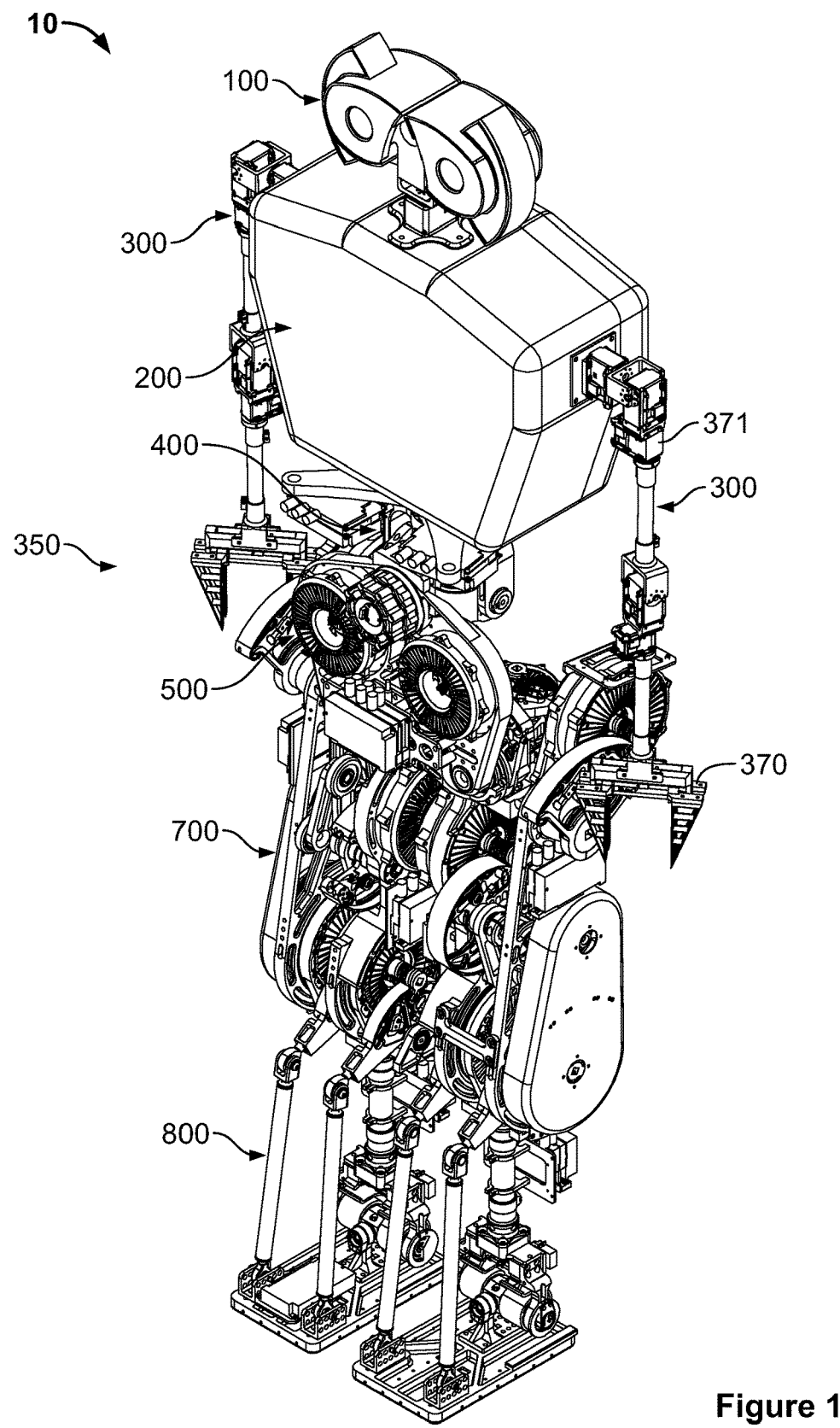
FIG. 1 is an isometric view of a biped robot according to an embodiment of the present disclosure.

The present disclosure is directed to robotic locomotion systems that include robotic actuator and transmission technologies to enable energy efficient locomotion in legged robots. In an embodiment, the technology is applied to bipedal humanoid robotic locomotion. In another embodiment, the technology may be applied to other configurations, such as, but not limited to quadruped and hexapod robotic systems, legged robotic systems designed to ride unpowered vehicles such as bicycles, skateboards or roller skates. The disclosed robotic locomotion systems achieve high versatility and energy efficient mobility.

The robotic locomotion systems include efficient actuator and transmission technologies that drive a variety of joint behaviors characteristic of locomotion under a variety of conditions (level walking at different speeds, up and downhill, up and down stairs, irregular terrain, running, etc.), rather than employing other strategies such as optimizing a single gait for level walking. Ultimate performance is measured by quantities such as Cost of Transport, which is defined as the input power divided by the robot mass times the gravitational constant times the rate of over ground travel, as well as the distance traveled on a single energy source (e.g. a battery) that the robot carries, or the amount of time the robot is able to locomote on a single energy source that it carries.

The robotic locomotion systems includes one or more electromagnetic actuators (e.g. electric motors) for fundamental electrical-to-mechanical energy conversion, plus one or more highly efficient speed-reducing transmissions (with gear ratios typically ranging from 5:1 to 10:1) and adds various support elements in parallel or series in order to make the core actuators operate more efficiently. The support elements transform the torque and/or motion curves seen by the motor without changing the torque or motion curves experienced at the joint. In an embodiment, a support element may be placed in parallel with the motor to change the relationship between torque produced at the motor and torque experienced by the joint, without changing the relationship between motion at the motor and motion of the joint. In another embodiment, a support element placed in series may change the relationship between the motion at the motor and the motion of the joint, without changing the relationship between torque produced at the motor and torque experienced by the joint. In a third embodiment, a support element may be placed either in parallel or in series and may change both the relationships between motion at the motor and motion of the joint and between torque produced by the motor and torque experienced by the joint. In an embodiment, one or more of the support elements are energetically passive, meaning that in these cases all mechanical work in the system originates from the core actuators or from the load. Although the total output work done by the actuators on the robot's joints does not change, the input (electrical) energy may change significantly by changing the operating profile of the core actuators (generally defined by speed vs. time and torque vs. time) which results in an increase or decrease in the average efficiency of the core actuator at transducing electrical energy to mechanical energy.

The present disclosure is further directed to methods for designing core actuators, highly efficient speed-reducing transmissions, and support elements for given joints and particular gaits including optimizing to minimize the electrical energy input per gait cycle. The method includes the following steps:

1) Obtain or generate data that describe the motion versus time (sometimes expressed as time percentage of gait cycle) and torque versus time trajectories for each joint involved in locomotion when executing particular cyclic gaits. At least one data set is required, though multiple data sets are frequently used for simultaneous optimizations. Data reflect assumptions about robot kinematics (e.g. link lengths and joint placements) and mass properties (individual link masses and moments of inertia, total system mass).

2) Select an approximate range of desired fixed gear ratios to use at each joint (for example, up to 10:1, for example to enable implementation in a single stage spur gear or rope/cable reduction)

3) For each joint axis (or, in some cases, multiple joints actuated together, e.g. through a differential), select an initial electromagnetic motor capable of achieving the appropriate output power as well as the output torque and speed with a gear ratio within the range selected in step #2. Create a mathematical model of the electromechanical dynamics of the motor, including parameters such as resistance, inductance, friction, inertia, and torque constant/back EMF constant.

4) Simulate the electromechanical dynamics of the motor selected, using a variety of different fixed gear ratios, executing the joint torque and motion trajectories for the selected joint. To whatever extent desired, include a dynamic model of the transmission to reflect loss or other factors resulting from the gear reduction. Use optimization tools to explore this space, and select the fixed gear ratio within the desired range that minimizes the electrical input energy (integral of voltage*current). This establishes a baseline performance value without any support elements 5) Select or generate one or more support element topologies of interest. Examples of support element topologies include an elastic element (spring) in parallel with the joint actuator, a four-bar mechanism in series between the joint actuator and joint, an elastic element in series with the joint, an elastic element that couples multiple joints together, etc. Express each support element topology of interest as a transformation applied to the joint behavior (as expressed by the data sets) that produces a modified set of joint actuator motion and torque trajectories. Select one or more parameter that defines each support element (e.g. a spring rate or one or more link lengths in a four-bar mechanism) that is varied with optimization tools.

6) Apply optimization tools to determine the support element configuration(s) that minimizes the electrical input energy required at the joint actuator. For each configuration, apply the electromechanical dynamic model of the motor from step #4 to determine the electrical input energy required. A fixed gear ratio on the actuator may be simultaneously co-optimized with the support element parameters. Within the optimization, apply constraints as desired or needed to each variable parameter, e.g. to avoid singularities or physically unachievable parameterizations.

7) As desired, iterate steps 5 and 6 to explore different support element topologies.

8) As desired, iterate steps 2 through 7 to explore different gear ratio ranges and different electromagnetic joint motors 9) Perform the process for all joints, considering compatibility of configurations across joints.

10) Select the support element topologies and parameterizations, motors and fixed gear ratios that minimize total electrical energy across all joints while conforming to other constraints and design considerations The present disclosure is further directed to core electromagnetic actuators and fixed gear-ratio transmission systems that generate torque and motion in an energy-efficient manner. Selection of both the motor and the transmission must be considered carefully and together. According to an embodiment, the robotic locomotion systems includes one or more electromagnetic actuators and fixed gear-ratio transmission systems that generate torque and motion in an energy-efficient manner. Selection of both the motor and the transmission must be considered carefully and together.

The disclosed robotic locomotion systems include electromagnetic actuators combined with transmissions with moderate gear ratios (3:1 to 15:1) to maximize specific torque and energy efficiency in the relevant operating ranges. In an embodiment, the gear reductions may be between 5:1 and 10:1. The utilized gear reductions result in efficient energy use as energy lost to friction, heat, noise, and excessive drivetrain accelerations, are minimized, and these gear reductions achieve effective dynamic walking by effective torque control at the joints, which requires actuators with low mechanical output impedance, whereas large gear ratios significantly increase effective output impedance. Using lower gear ratios requires large torques from the core electromagnetic actuators (e.g. electric motors) in order to achieve desired joint torque trajectories. Electromagnetic motors have limited specific torque (torque per unit mass), therefore larger torques require more massive motors. Furthermore, because torque is proportional to current and Joule heating loss is proportional to the square of current, losses are greatest when the torque is highest from any given motor. Because walking robots must carry the mass of their actuators, it is generally necessary to use gear ratios larger than 1:1 in order to reduce the electric motor masses to sizes that can be carried.

Selecting electromagnetic actuators that maximize specific torque co-minimizes both actuator mass and required gear ratio. Several factors impact the specific torque. These generally may include having a large number of magnetic poles, having a large air gap radius and a hole in the center, and having windings with a large number of wire turns to maximize torque and minimize speed. It is noteworthy that for many applications, high motor speeds are desirable, whereas for robotics it is frequently preferable to have lower speeds and higher torque.

The disclosed robotic locomotion systems include cables or ropes and pulleys for gear reductions. The gear ratio is defined by the ratio of the radii of two mating pulleys, or the ratio of radii of a bobbin and a mating pulley. Steel cables or synthetic ropes may be used. These transmissions avoid certain problems associated with mechanical gears (e.g. spur gears) including backlash and noise. In some cases they may also require less mass than mechanical gears to achieve the same gear reductions at the same torque levels. Synthetic ropes may enable larger gear reductions by accommodating smaller bend radii at load than steel cables.

The disclosed robotic locomotion systems further include support elements that provide passively variable gear ratio mechanisms. Varying the effective gear ratio between a joint motor and the joint output within a gait cycle may offer significant energy benefits. This approach enables large gear ratios to be used when high torques are required but high speeds are not needed, and smaller gear ratios to be used when speed is important but torques are modest. Tuning the gear ratio throughout the gait cycles enables the motor to be kept in more energy efficient operating regimes. However, actively varying the gear ratio throughout a gait cycle would require changing the gear ratio several times per second at normal humanoid walking speeds, and generally energy would be spent actively changing the gear ratio. Instead, using mechanisms the gear ratio may be varied passively (without energy spent on changing the gear ratio) in a predetermined pattern throughout a gait cycle. Three examples include noncircular gear pairs (where the motor drives one gear and the output is driven by the other, and gear ratio varies with the instantaneous ratio of the radii of the gears at the point of tooth engagement), cam-follower systems (where the instantaneous radius of the cam and angle of the follower dictate gear reduction) and four-bar mechanisms (where the motor drives one link and the output is driven by another link, and the gear ratio is determined by the kinematics). In each case, the instantaneous joint angle is associated with a particular gear ratio. Mechanisms may be designed based on joint data to provide cyclic profiles that are advantageous throughout the gait cycle. This takes advantage of the cyclic, repetitive nature of legged locomotion.

In an embodiment, the variable gear ratio mechanisms are adjustably passive. Adjustably passive means that physical changes/adjustments may be made to the variable gear ratio mechanisms to change the gear ratio vs. angle profile. These adjustments may be made manually or by driving an actuation system, but when executing a cyclic behavior (e.g. a gait), the adjustments are locked and the mechanism is fully passive. It is desired to move efficiently under a variety of different conditions using different gaits. Examples include: walking on level ground at different speeds, walking more dynamically to improve gait efficiency vs. walking more conservatively to improve stability, walking up or down stairs or slopes, walking over rubble or terrain, standing in place, performing deep knee bends, running, etc. It may not be possible, and it is generally not optimal, to design passively variable mechanisms that improve energy efficiency for all of these gaits. Therefore it may be desirable to make physical adjustments to the passive mechanisms when changing between gaits. Although energy may be spent adjusting the mechanism, these adjustments are relatively infrequent and only associated with discrete changes in behavior (as opposed to continuous adjustments happening during a gait cycle while executing a particular repetitive gait). Mechanism behaviors may be adjusted in important ways by making physical changes. For example, links in a four bar mechanism may be shortened or lengthened.

In an embodiment, the angle between the output link of a four bar mechanism (or an output gear of a non-circular gear pair) and a limb segment may be increased or decreased, shifting the "gear variation versus joint angle" trajectory with respect to the joint angle. Changes may be discrete or continuous, and may be actuated in a variety of ways including using electric motors and ball screws, wedges, hydraulic or pneumatic actuators, solenoids, or complex linkages activated by specific movement of the actuator through a prescribed profile. In an embodiment, the angle between the output link of a four-bar mechanism and a limb segment may be adjusted by changing the relative clocking of a belt that transmits torque between one pulley that is rigidly coupled to the output link and another pulley that is rigidly coupled to the limb segment.

In an embodiment, the support elements may be elastic elements. Elastic elements (e.g. springs) placed at the joints or acting across several neighboring joints may also offer significant energy benefits. Springs may be kinematically located in parallel with a joint and the motor that drives it, or in series between the motor and the joint. When using back drivable electric motors, we have found parallel springs to offer the greatest energy benefits as they can "unload" the motor, reducing the total torque required to be produced. Joint springs offer several potential benefits:

1) They may create a dynamic resonance that allows a joint or series of joints to automatically execute a desired dynamic profile when energy is injected at the appropriate frequency; and 2) Certain joints in certain gaits have quasi-static characteristics that resemble those of springs, for example a consistent relationship between joint angle and torque. Appropriately designed springs can change the torque loading seen by the motor, for example reducing the peak or root mean squared torque, in turn reducing motor current and Joule heating (I2R) losses.

Other investigators have shown that #1 works for certain legged robotic configurations. We have primarily focused on #2, and have found that this can substantially reduce the electrical input energy required. It is important to note that springs (like variable gear ratios) do not change the net mechanical work that must be produced by the motor—they simply allow the motor to operate in a more efficient regime when producing that same amount of energy.

It is also important to note that springs may offer a significant energy benefit even under idealized assumptions that the motor may act as a generator and negative energy may be recovered and re-used on the electrical side without loss. This is because converting the mechanical work to electrical energy and subsequently turning it back into mechanical work requires twice absorbing I2R losses—once when the motor acts as a generator, and again when it acts as a positive work producer. By contrast, if energy is stored in the mechanical domain in a spring and subsequently released as the spring returns, I2R losses are not encountered in either direction of energy flow.

Springs may be implemented in a variety of ways (mechanically, hydraulically, and pneumatically), may be linear or nonlinear, and could be translational or rotary. They may act on a single joint or on several neighboring joints simultaneously.

In some cases, it may be desirable to have support elements active only within certain phases of the gait under which certain conditions apply. For example, in some gaits it is advantageous to have a spring in parallel with the ankle joint only during the stance phase (when the foot is in contact with the ground). When the foot is in swing phase, the spring hinders movement of the foot and requires the motor to expend extra energy to overcome the spring. In this case, the period in which the spring is useful is strongly correlated with the presence of ground reaction forces at the foot, which propagate through the leg. This correlation exists because when the foot is not in contact with the ground, moving the foot relative to the lower leg requires only overcoming minimal drivetrain friction and the inertia of the foot. By contrast, when the foot is in contact with the ground, moving the foot relative to the lower leg requires moving the inertia of the entire robot, which requires much greater torques. This fact may be used to passively engage and disengage the parallel support element only when there is a compressive force on the foot or in the lower limb of the leg.

Attention must be paid to the state of the system at the point of engagement and disengagement. For example, the ankle spring discussed above is engaged and released when there is no energy stored in the spring. If it is advantageous to engage or disengage under load, different designs must be considered.

Support elements may also be engaged and disengaged actively, for example by using an additional clutching actuator. Examples include electromagnetic clutches, solenoids, electrostatic clutches, hydraulic or pneumatic clutches, etc. Minimal energy to switch clutch state and bi-stable clutches (so that energy need not be expended to hold the clutch in either state) are preferable, as state changes may be made several times per gait cycle.

It is desired to move efficiently under a variety of different conditions using different gaits. Examples include: walking on level ground at different speeds, walking more dynamically to improve gait efficiency vs. walking more conservatively to improve stability, walking up or down stairs or slopes, walking over rubble or terrain, standing in place, performing deep knee bends, running, etc. It may not be possible, and it is generally not optimal, to design joint springs that improve energy efficiency for all of these gaits. Therefore it may be desirable to make physical adjustments to the springs when changing between gaits. Although energy may be spent making these adjustments, these adjustments are relatively infrequent and only associated with discrete changes in behavior (as opposed to continuous adjustments happening during a gait cycle while executing a particular repetitive gait). This is directly analogous to the situation described for the passive variable mechanisms above. Spring adjustments may include changes to effective spring constant (e.g. by making more or less of the spring material inactive or changing an effective gear ratio between joint angle and spring deflection), changes to equilibrium point (e.g. by changing the joint angle(s) at which there is no torque or force in the spring), and changes to the joint angles over which a spring is active. Changes may be discrete or continuous and may be actuated in a variety of ways. An example implementation, for the ankle, is described below. In this case, the spring engages with the joint only during stance by inserting a flange into a slot. Multiple slots are included for different gaits, which changes the equilibrium position of the spring relative to the joint angle.

Electric motors generate heat when they operate due to I2R losses. Heat and temperature interact with motor energy performance in several ways:

1) The continuous torque capacity of motors is generally thermally limited, meaning that failures occur if the motor is allowed to heat up too much by applying too much torque; and 2) Higher temperatures increase the resistance of the copper wires that make up the motor windings, which results in increased I2R losses, and reduced energy efficiency, for the same current and torque levels.

Therefore keeping a motor cooler may be advantageous from a system energy perspective in at least two ways:

a) If the torque capacity may be increased by cooling, smaller motors may be used, which reduces the total system mass and alleviates energy demands on the other joints; and b) Cooling may directly save energy by reducing resistance.

According to an embodiment, a humanoid biped robot is disclosed that includes adjustable support element topologies across the various leg joints to obtain widespread energy benefits. These topologies are predicted to benefit several gaits ranging from extremely conservative crouched gaits (characterized by significantly bent knees and relatively flat-footed ground contact) to highly dynamic humanlike gaits (characterized by clear heel strike and toe off events and relatively straight legs). Remarkably, when taken together, this set of adjustments is predicted to have a positive energy benefit on an extremely wide variety of gaits in our gait database (even including running, stair climbing, walking over rubble, standing still, etc.), and is not predicted to negatively impact any gaits. The topologies and adjustments are described, joint by joint, below:

Ankle "X" flexion/extension: A parallel spring that engages only in stance phase, and that has an equilibrium position that may be adjusted when transitioning from one gait to another. Gaits that involve a strong heel-toe ankle action with a significant toe-off can generally benefit from storing energy in early stance and releasing it at toe-off. Less dynamic gaits with less ankle action (e.g. crouched gaits) also may benefit, but not as significantly.

Knee: A series four-bar mechanism that creates a variable gear ratio with joint angle. The angle between the output link and the lower leg may be adjusted when transitioning between gaits. For some gaits, it is beneficial to increase the gear ratio with knee angle to produce higher torques. For example, during stance phase conservative, crouched gaits create tremendous torques on the knee due to departure from the skeletal singularity. However, during the swing phase of crouched gaits the knee bends even further and requires a lower gear ratio to move rapidly.

Hip "Y" flexion/extension: A parallel spring with an adjustable equilibrium position. In human gaits, the hip behavior strongly resembles a linear spring. This behavior does not emerge as clearly in some simulated and demonstrated robot gaits, but as gaits become more humanlike, this may be more pronounced. Because the benefit is modest for our dynamic simulated gaits, it may be worth exploring this joint further to look for improvements. A hip spring also aids conservative, crouched gaits by applying a restoring torque to help support body weight.

Hip "X" abduction/adduction: A fixed spring that only acts in compression, and only in adduction. This support element provides a strong benefit for essentially all gaits. Physically, when one leg leaves the ground, the center of gravity shifts toward the stance leg, forcing the stance hip into adduction. The spring simply provides a restoring torque to hold the hip in this position.

Example: Biped Robot

FIG. 1 is an illustration of a biped robot assembly or biped robot (robot) 10 according to an embodiment of the disclosure. As can be seen in FIG. 1, the robot 10 includes a head subassembly 100, a chest subassembly 200 and a locomotion subassembly 350. The locomotion subassembly 350 includes a torso subassembly 400, a hip subassembly 500, a thigh subassembly 700 and a shank subassembly 800.

Figure 2:
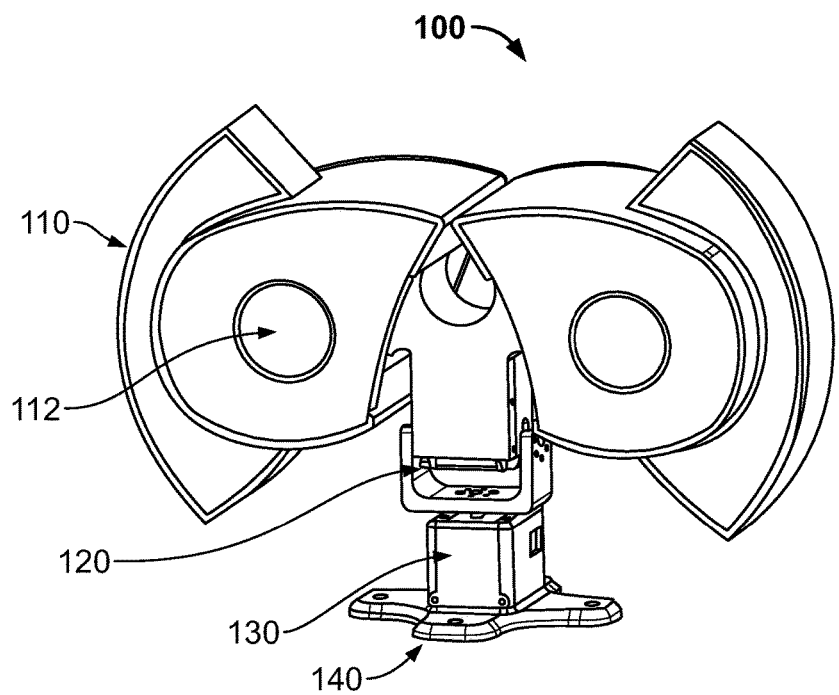
FIG. 2 is an illustration of a head subassembly according to an embodiment of the present disclosure.

FIG. 2 shows a more detailed view of the head subassembly 100. As can be seen in FIG. 2, the head subassembly 100 includes an eye subassembly 110 that is moved relative to the chest subassembly 200 by a yaw actuator 130 and a pitch actuator 120, which are connected to the chest subassembly 200 through a mounting bracket 140. The yaw actuator 130 and pitch actuator 140 are, for example, Servos as used for typical small scale robotics or radio controlled systems. The eye subassembly 110 may include one or more sensors 112, for example an electro-optical camera sensitive to visible and/or infrared wavelengths, and/or a laser ranging sensor for example a laser line scanner or a 3D laser scanner. The yaw actuator 130 and pitch actuator 140 are used to orient the one or more sensors 112 in a desired direction relative to the robot's body. The yaw actuator 130 and pitch actuator 140 are arranged in a serial linkage, for example with the yaw actuator 130 closest to the chest subassembly 200. In another embodiment, the head subassembly may include other sensor and actuator arrangements and components.

The chest subassembly 200 includes a processor (not shown) for controlling and operating the robot 10. The chest subassembly 200 may also include one or more routers for directing control logic flow to and from the appendages and the processor, batteries, power electronics for power conditioning and routing, relays for switching portions of the robot off and on, and wired or wireless communications devices for command, control and telemetry. In this exemplary embodiment, the chest subassembly 200 also includes two arm subassemblies 300. The arm subassemblies 300 may manipulate and grasp objects. The arm subassemblies 300 include one or more actuators 371 arranged in a serial linkage. The arm subassemblies 300 include gripper subassemblies 370 can open and close to grasp and release objects. The gripper subassemblies 370 may be actuated by a Servo or DC brush motor (not shown), for example. In another embodiment, the chest subassembly 200 may have other arrangements, for example, one or more arm subassemblies, and may include one or more sensors and/or tools.

Figure 3:
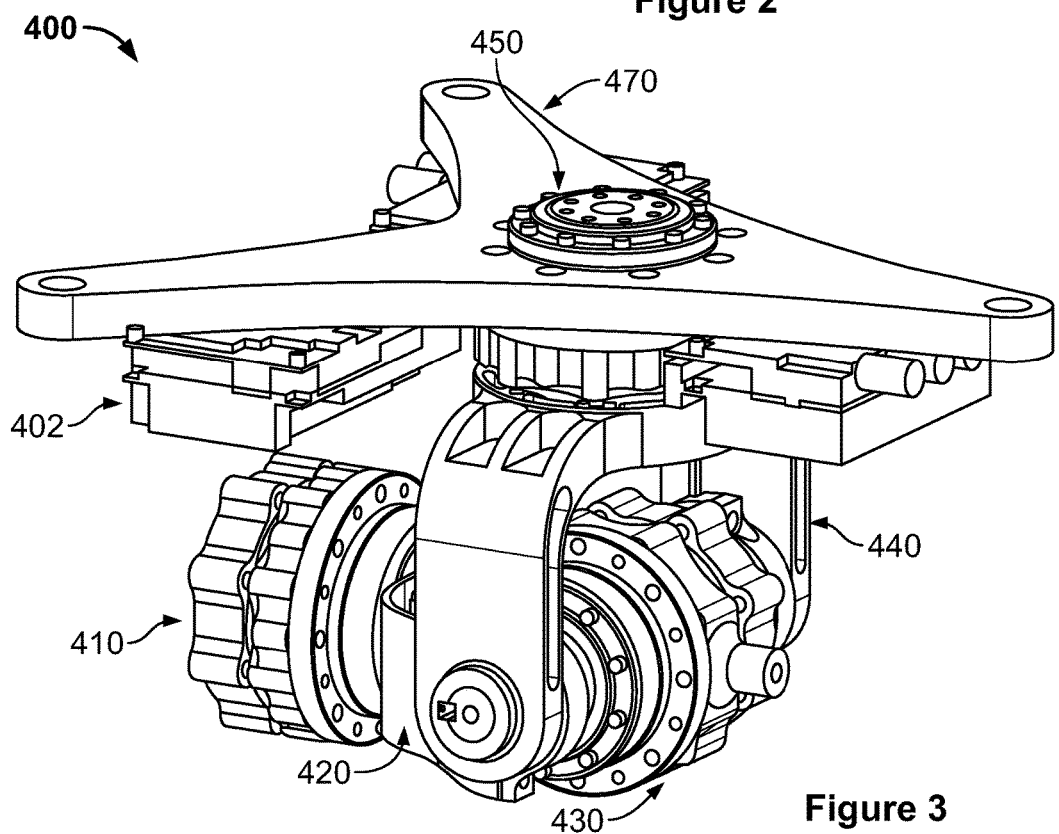
FIG. 3 is an illustration of a torso subassembly according to an embodiment of the present disclosure.
Figure 4:
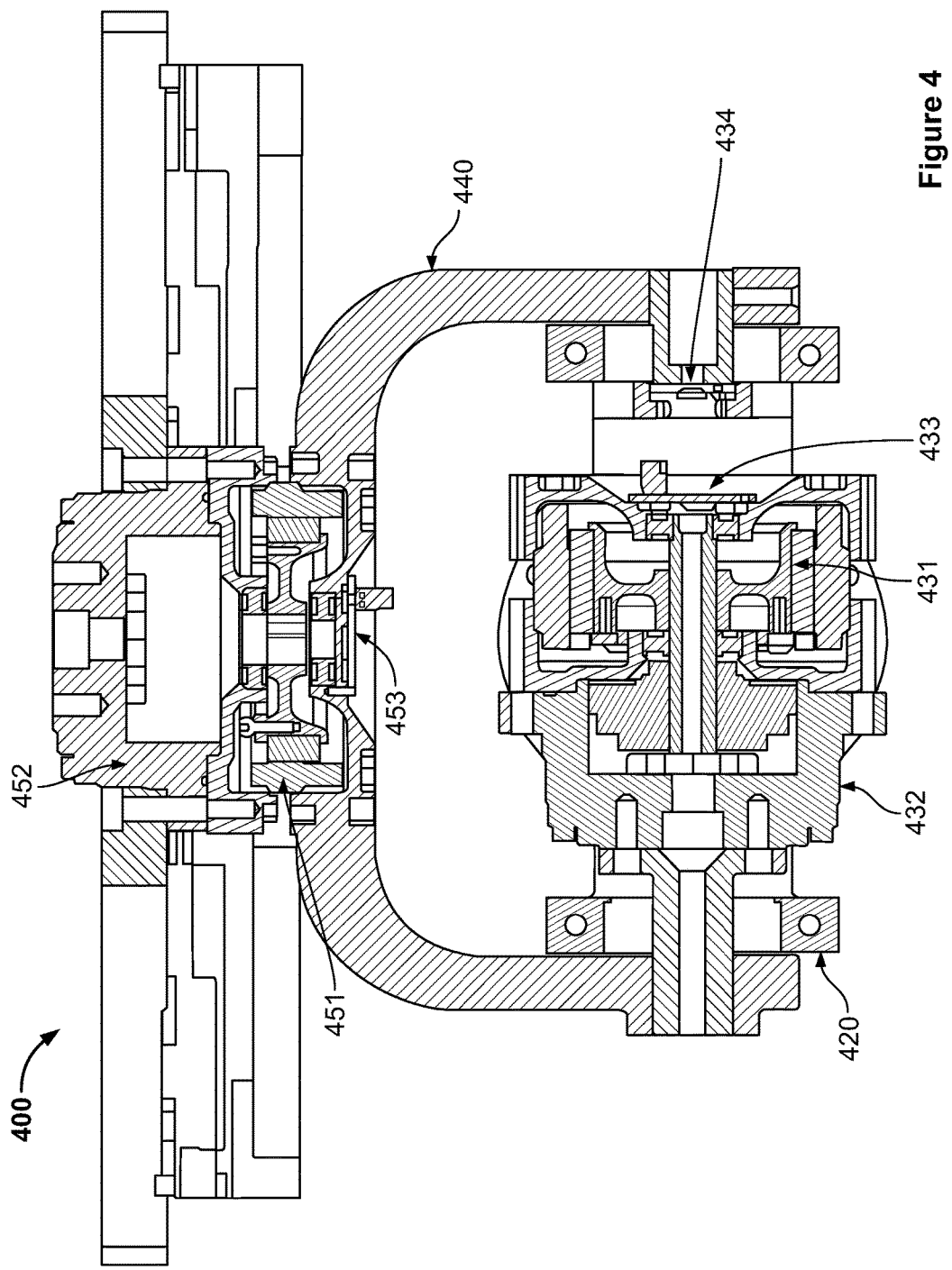
FIG. 4 is a cross sectional view of the torso subassembly of FIG. 3.
Figure 5:
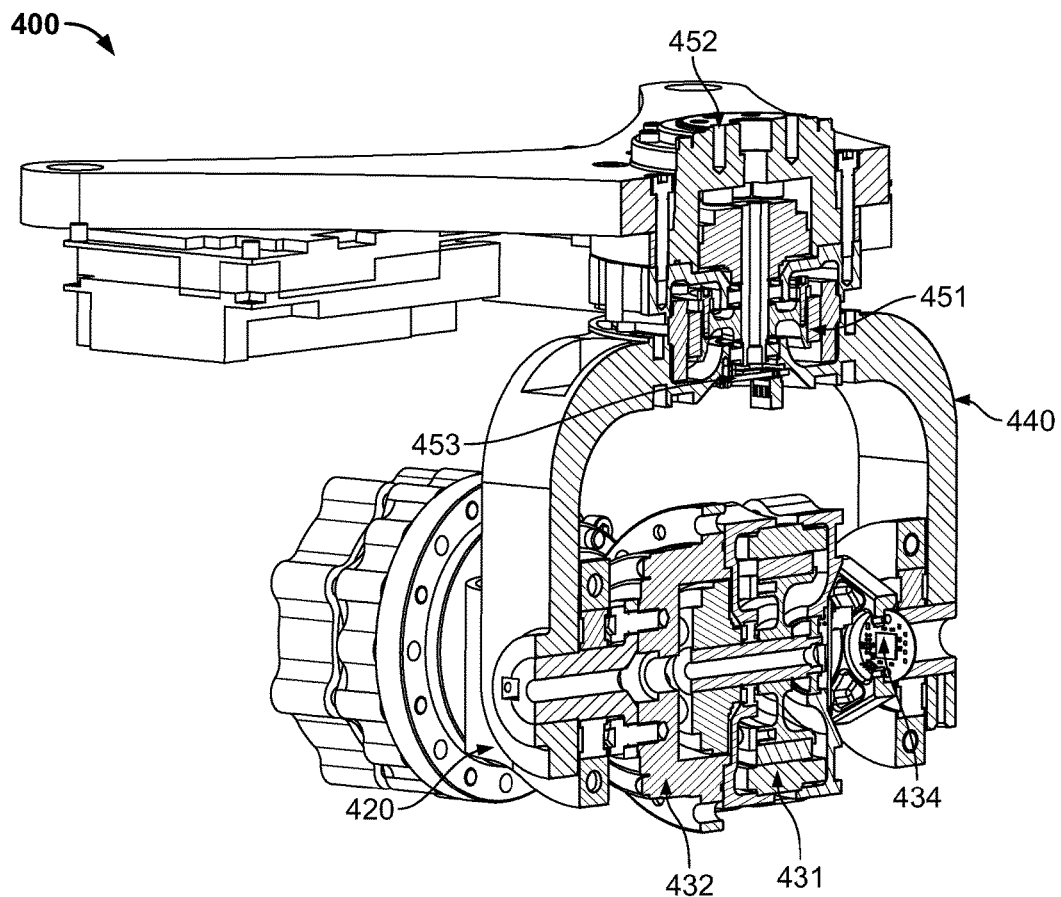
FIG. 5 is a partial cross sectional view of the torso subassembly of FIG. 3.
Figure 6:
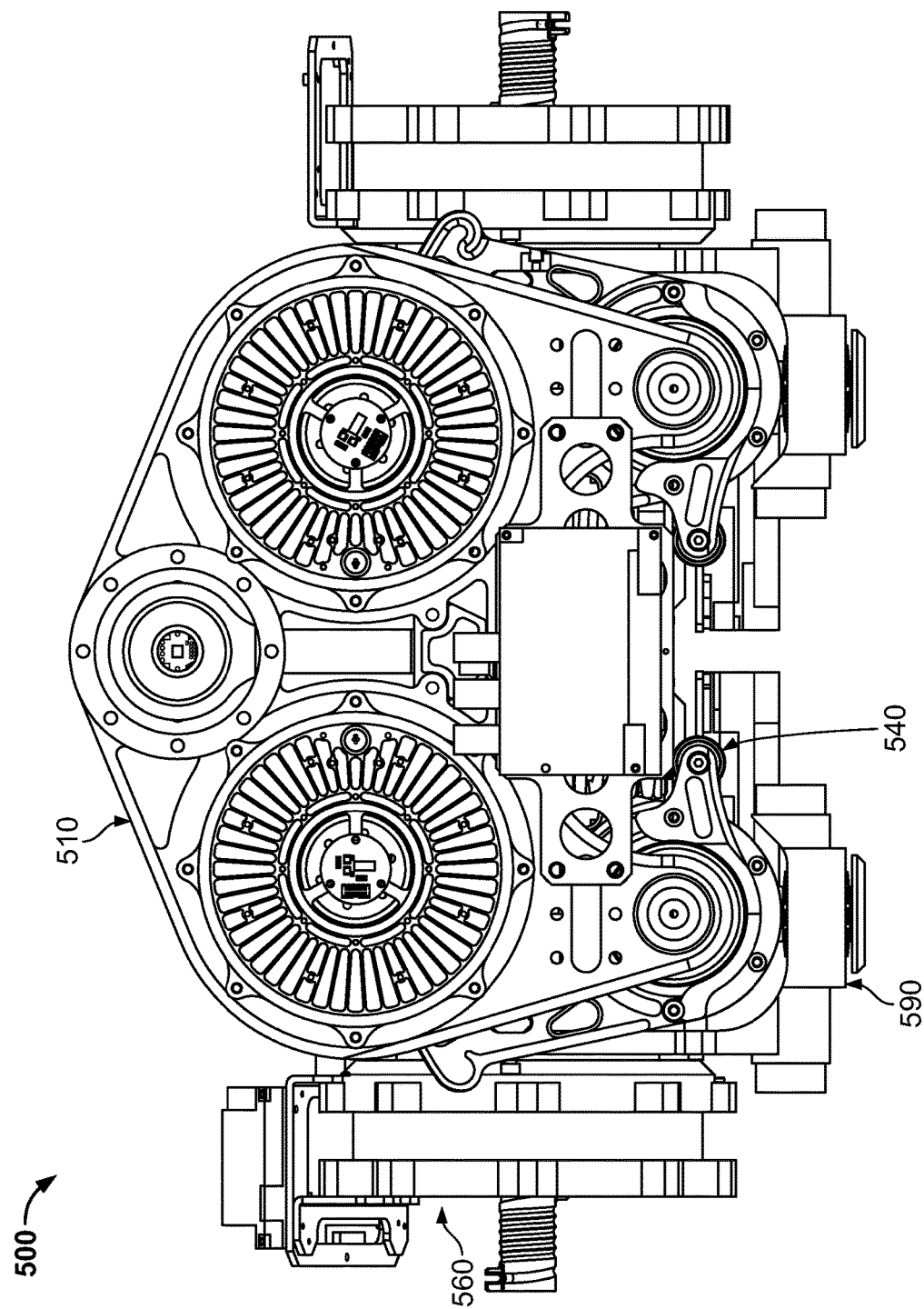
FIG. 6 is a front view of a hip subassembly according to an embodiment of the present disclosure.
Figure 7:
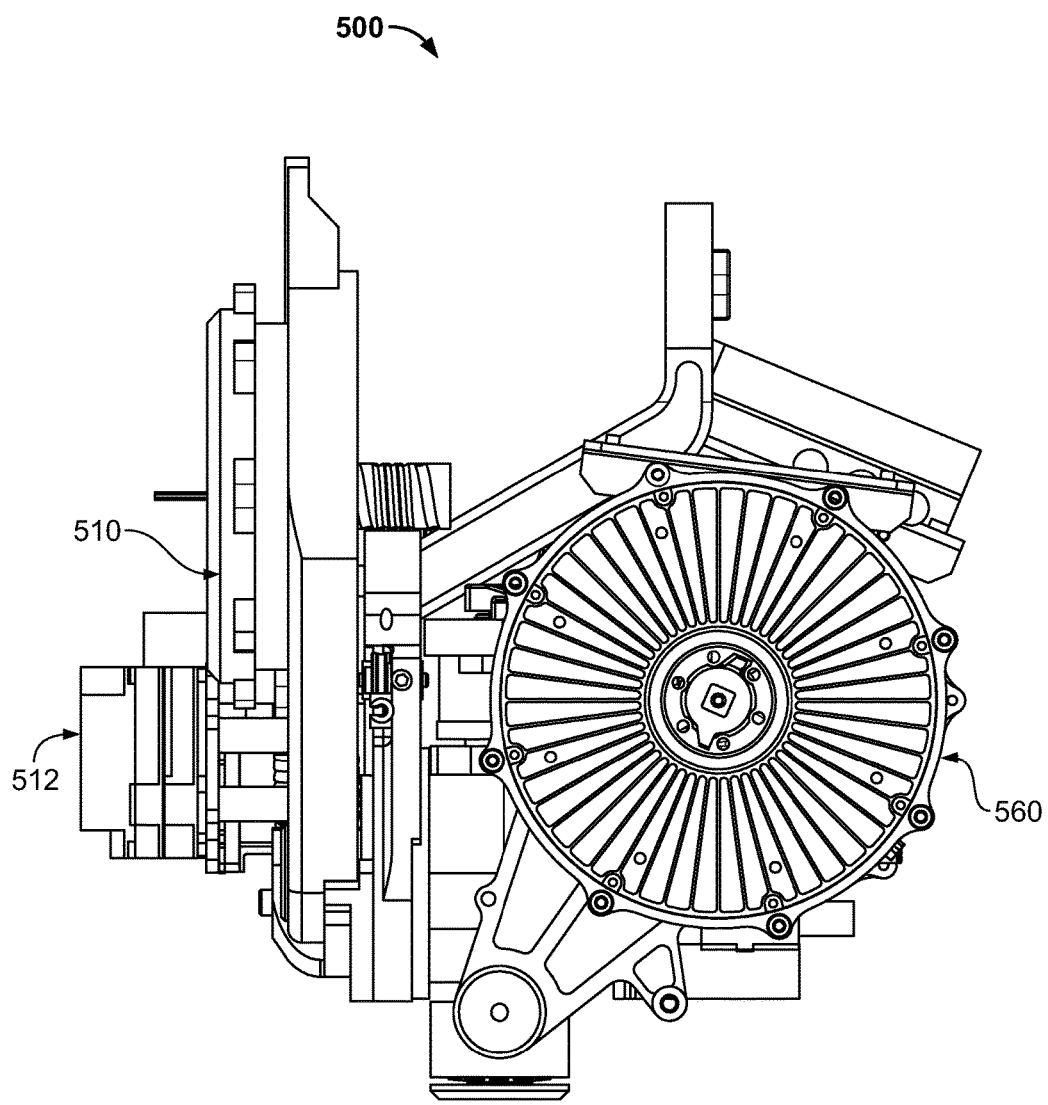
FIG. 7 is a side view of the hip subassembly of FIG. 6.
Figure 8:
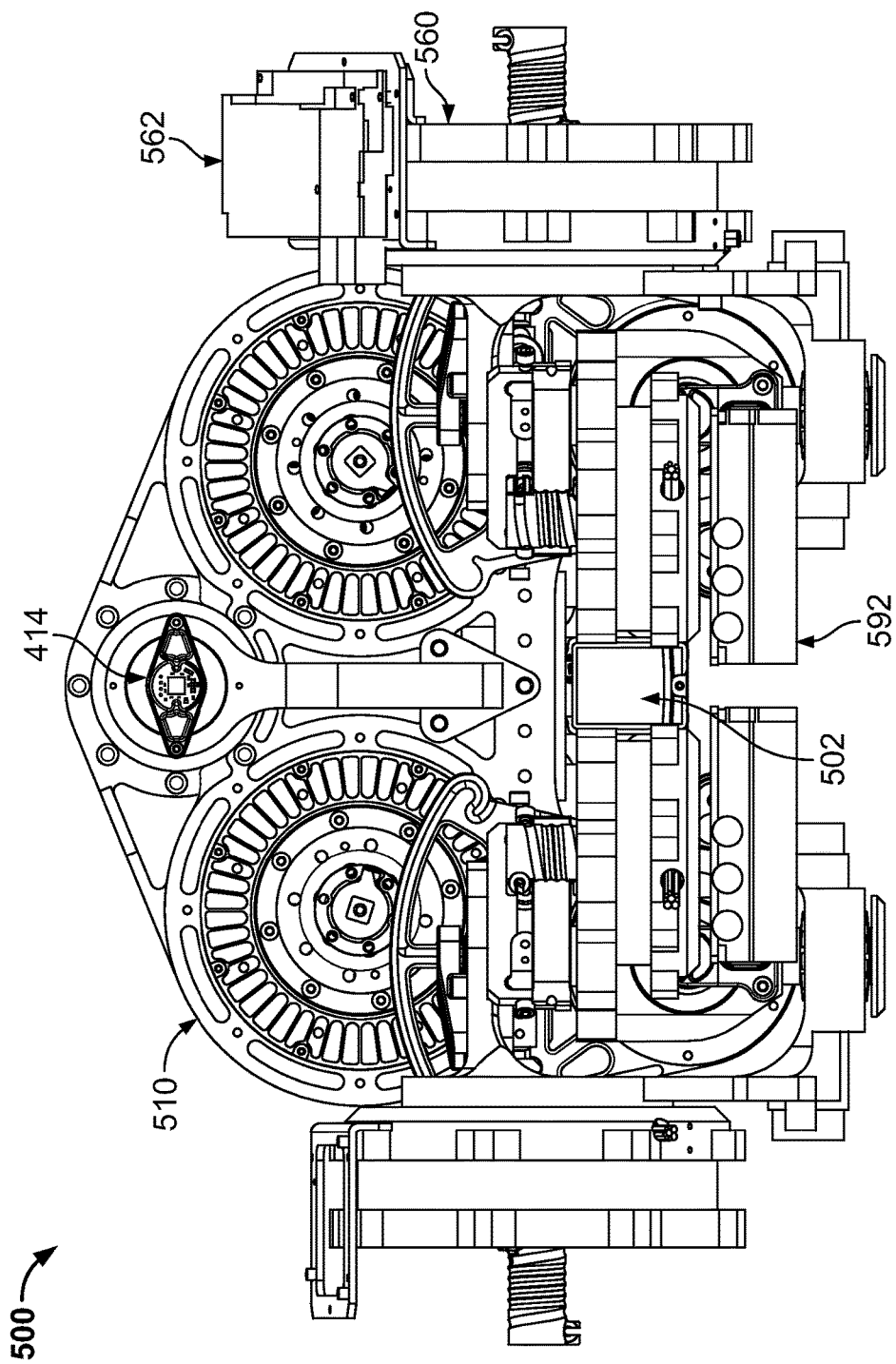
FIG. 8 is a rear view of the hip subassembly of FIG. 6.
Figure 9:
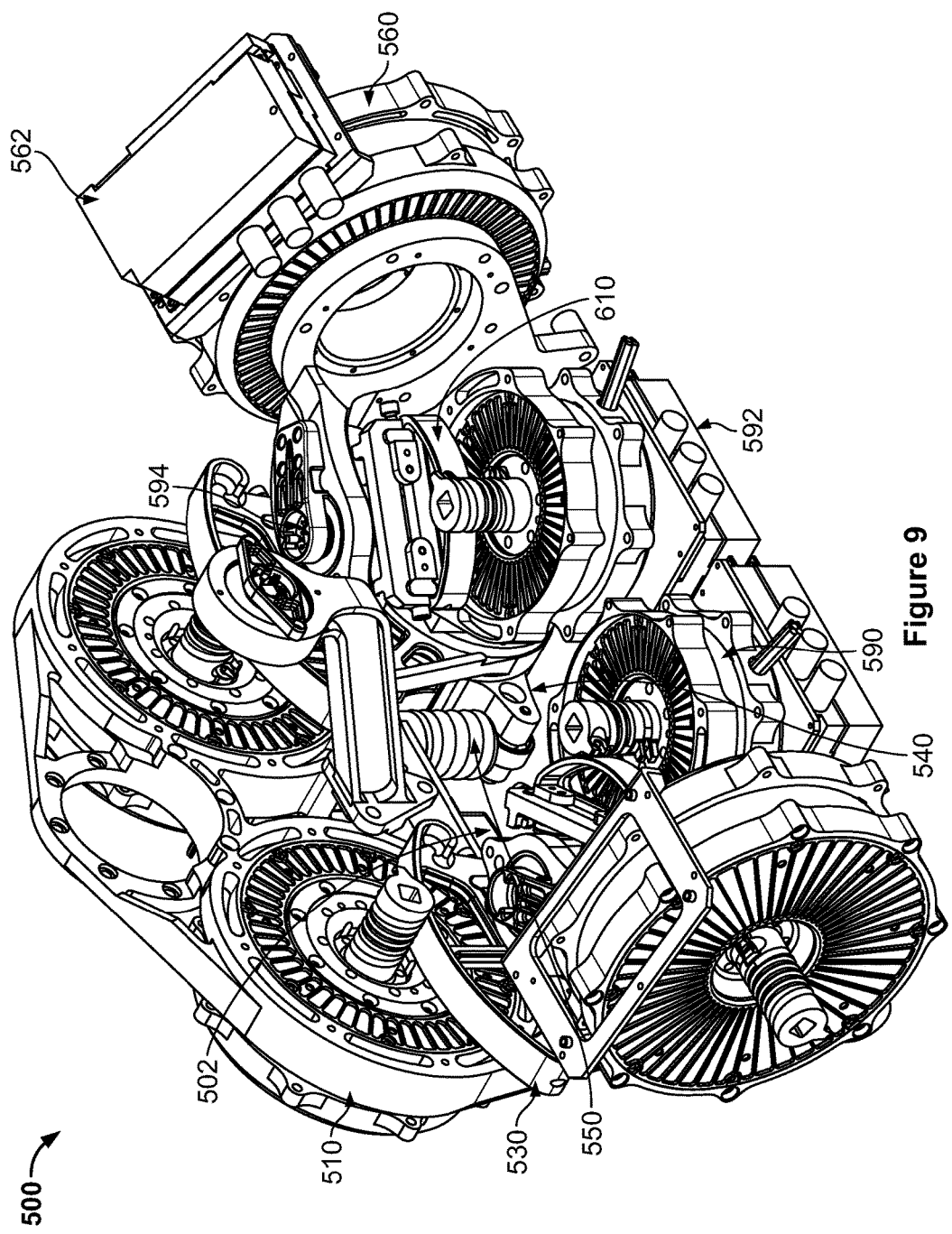
FIG. 9 is an illustration of a hip subassembly according to an embodiment of the present disclosure.

Referring again to FIG. 1, the locomotion subassembly 350 includes a torso subassembly 400, a hip subassembly 500, a thigh subassembly 700 and a shank subassembly 800. FIGS. 3-5 show a more detailed view of the torso subassembly 400. As can be seen in FIGS. 3-5, the torso subassembly 400 includes three torso actuator electronics subassemblies 402, a torso roll subassembly 410, a torso roll to pitch yolk, 420, a torso pitch to torso yaw yolk 440, a torso yaw subassembly 450, and a robot support plate 470. In another embodiment, the torso subassembly 400 may include one or more torso actuator electronic subassemblies. The torso subassembly 400 moves the chest subassembly 200, head subassembly 100 and arm subassemblies 300 with respect to the robot's Hip subassembly 500. Movement is in 3 serial rotational degrees of freedom, including pitch 430, roll and yaw subassemblies 410, 450. The mechanism is designed such that the axes of rotation for the pitch, roll and yaw joints all intersect at a single point, the center of rotation for the torso subassembly 400.

The pitch, roll and yaw subassemblies 430, 510, 450 each include a motor (451, 431, 411), for example a high-torque frameless, brushless DC motor, a transmission (452, 432, 412), for example a Harmonic Drive with gear ratio ranging from 50:1 to 300:1, and a motor encoder (453, 433, 413) for motor commutation. The pitch and roll axes also include joint encoders (434, 414) to measure the output angle of the joint.

The robot support plane 470 provides an interface from which the weight of the robot may be externally supported, e.g. by a stand or by hanging from straps. Electronics subassemblies 402 for each of the three torso actuators are mounted to the robot support plate 470. Each electronics subassembly 402 includes logic and power electronics to drive the joint actuators in either motion or torque control modes.

Actuation of the torso roll motor 411 drives movement of the torso roll to torso pitch yolk 420 relative to the hip subassembly 500. Actuation of the torso pitch motor 431 drives movement of the torso pitch to torso yaw yolk 440 relative to the torso roll to torso pitch yolk 420. Actuation of the torso yaw motor 451 drives movement of the chest subassembly 200 relative to the torso pitch to torso yaw yolk 440.

FIGS. 6-9 show the hip subassembly 500. The hip subassembly 500 includes a total of 6 degrees of freedom: 3 for the right leg, and 3 for the left leg. The two legs are mirrored. As can be seen in FIGS. 6-9, the Hip Subassembly (500) includes a Robot IMU (502), a multiple degree of freedom inertial measurement unit that may include up to 3-axis accelerometers, 3-axis gyroscopes, and 3-axis magnetometers, for example a xSense MTi-300. Each leg includes three serial degrees of freedom that move the thigh subassembly 700 (see FIG. 1) relative to the hip X frame 511.

Figure 10:
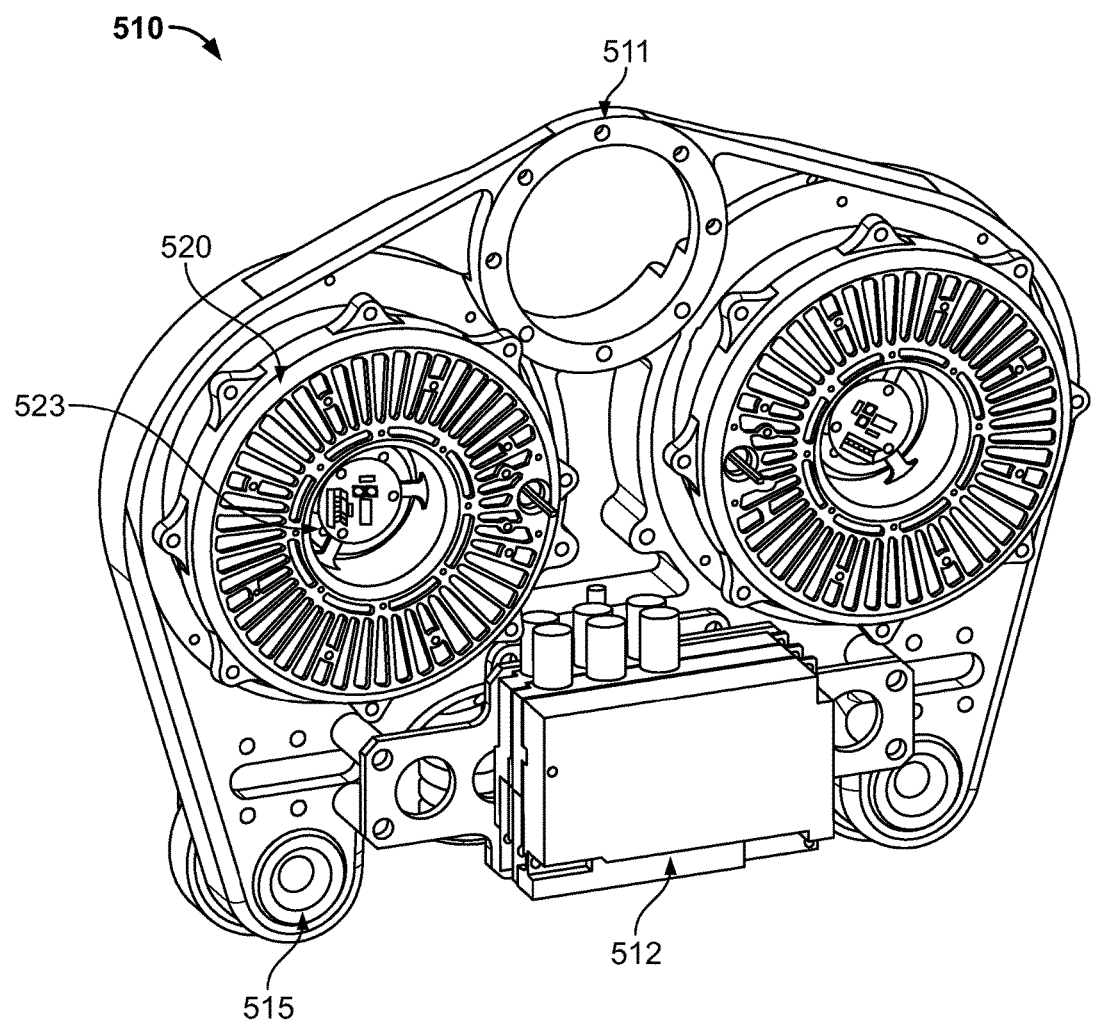
FIG. 10 is an illustration of a hip X subassembly according to an embodiment of the present disclosure.
Figure 11:
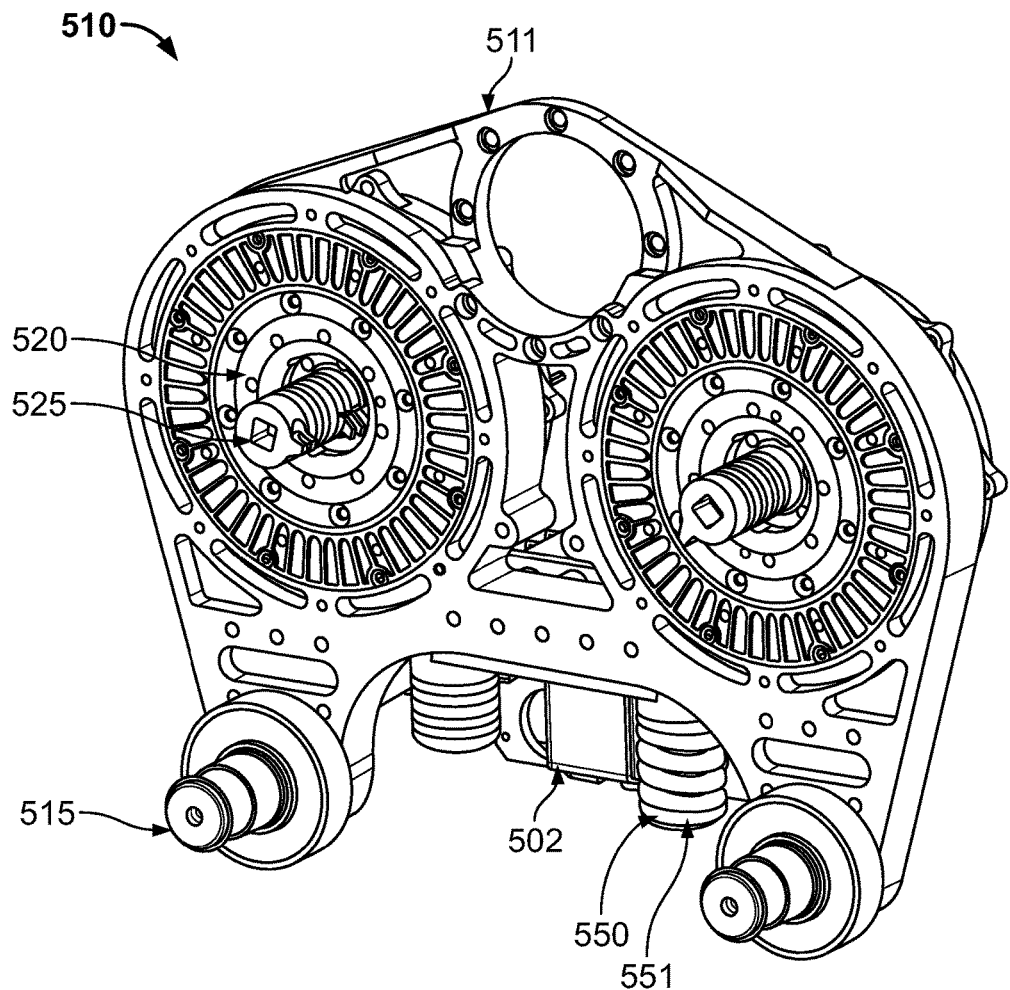
FIG. 11 is a rear isometric view illustration of the hip X subassembly of FIG. 10.
Figure 12:
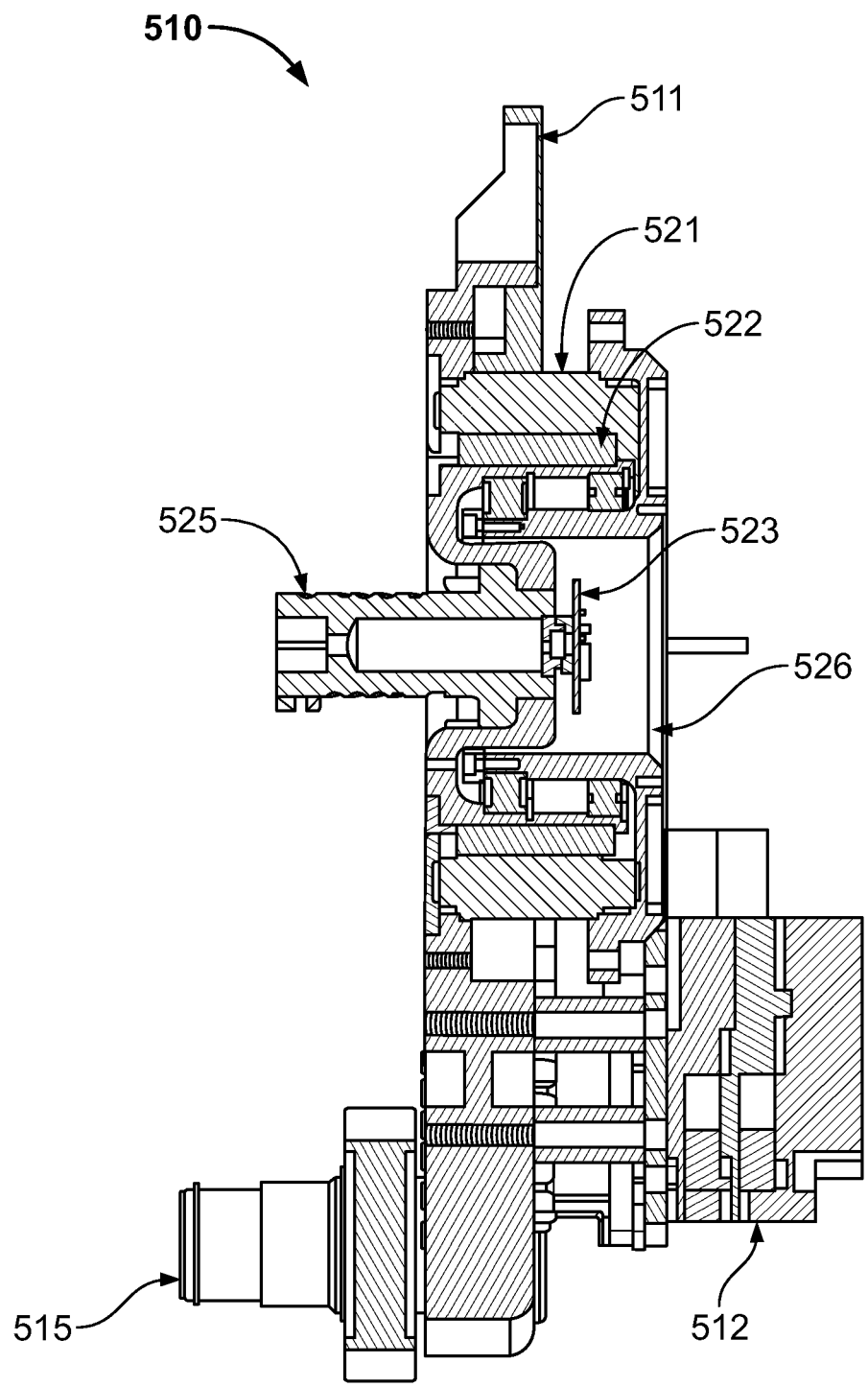
FIG. 12 is a side cross sectional view of the partial hip X subassembly partial view of FIG. 11.

The hip subassembly 500 further includes the hip X subassembly 510 shown in more detail in FIGS. 10-12. The hip X subassembly 510 contains the drive system that creates torque for roll rotation. The hip X subassembly 510 includes two hip X motor subassemblies 520. The hip X motor subassembly 520 includes a hip X motor stator 521 and hip X motor rotor 522. A lightweight, thermally conductive hip X motor housing 526 is used to locate the rotor and stator and ball bearings. A hip X motor encoder 523 measures rotational position of the hip X motor's rotor relative to its stator. The motor and encoder are driven through the hip X electronics subassembly 512. The rotor of the hip X motor subassembly 520 is rigidly coupled to the hip X bobbin 525. Note that the discussion of the hip X subassembly 510 is the only place where the motor subassemblies are described in detail, however similar basic motor subassembly structures, though with different sizes and slightly different interfaces, is used on all of the other leg motors.

The hip X bobbin 525 is the input stage to a speed-reducing rope transmission subassembly 630 (see for example FIGS. 25 and 25A) functionally similar to the hip Y pulley subassembly 580 (see FIG. 25 below). The hip X pulley subassembly 530 is the output stage of this speed-reducing transmission. The hip X pulley subassembly 530 rotates about the hip X joint shaft 515. The hip Z subassembly 590 is rigidly coupled to the hip X pulley subassembly 530. Actuation of the hip X motor subassembly 520 drives movement of the hip Z subassembly 590 relative to the hip X frame 511. A hip X joint encoder (not shown) is mounted to the hip Z subassembly, and measures the hip X joint motion about the hip X joint shaft 515.

The hip X spring roller subassembly 540 is also rigidly coupled to the hip X pulley subassembly 530 and the hip Z subassembly 590. At certain angles of rotation of the hip X pulley subassembly 530 relative to the hip X frame 511, the hip X spring roller subassembly 540 contacts the hip X spring subassembly 550. When the hip X spring roller subassembly 540 is in contact with the hip X spring subassembly 550, stress is developed within an intentionally compliant spring 551, resulting in torque being applied between the hip X frame 511 and the hip X pulley subassembly 530 about the hip X joint shaft 515. This joint torque is applied in parallel with the joint torque generated by driving the hip X motor subassembly 520; therefore the net joint torque is the sum of the motor torque times the gear ratio created by the speed-reducing transmission, and the spring torque. Typical values for the joint stiffness created by the spring are 100 Nm/rad to 1000 Nm/rad [assuming robot is ~2 m tall and ~90 kg]. The geometry of the hip X spring subassembly 550 and hip X spring roller subassembly 540 may be configured to select the angle at which the two pieces come into contact. When in contact, the hip X spring subassembly 550 creates torque that resists motion of the hip X pulley subassembly 530 that moves the foot closer to the opposite foot in the Y (translation) direction. This torque increases with joint angle as the hip X pulley subassembly 530 moves such that the foot moves closer to the opposite foot in the Y (translation) direction, for example the torque increases linearly or approximately linearly with joint angle. The spring may be implemented as a compression spring, as shown in the figures, or a rotary coil spring, or other common ways. The spring subassembly 550 may apply a preload to the spring 551, such that the spring torque created by contact with the roller subassembly 540 initially rises to a significant level over a very small angular range, and then increases more gradually with the spring rate once the preload has been taken up. In some range of motion of the hip X joint, the hip X spring subassembly 550 and hip X spring roller subassembly 540 are not in contact, and therefore the spring does not create torque at the joint. In general, the angle of the hip X joint at which contact is first made between the hip X spring subassembly 550 and the hip X spring roller subassembly 540 is selected such that there is zero, or very little (e.g. <10 Nm) of torque created at the joint by the spring during the "swing" phase of walking, but there is significant torque (up to 100 Nm or more) created at the joint by the spring during the "stance" phase of walking. The primary function of the spring is to counteract the torque generated at the hip X joint by shifting the robot's center of gravity over the foot in order to maintain balance during the single-leg stance phase. By generating this torque with a passive mechanical spring rather than with the hip X motor subassembly 520, the peak torque required from that motor is significantly reduced. This in turn proportionally reduces the peak motor current required, which reduces the energy lost to Joule heating, which is proportional to the square of the peak motor current. Thus the spring results in significant energy savings. The angle at which contact is first made between the hip X spring subassembly 550 and the hip X spring roller subassembly 540 may be adjusted by shifting or replacing either part, or by moving either part with an actuator. This allows significant energy savings for different walking behaviors (e.g. for walking over rubble or upstairs, walking faster or slower, etc.). In other words, the spring is only active/engaged over a certain portion of the joint's range of motion, not all of it; and the spring only acts in one direction, it just "pushes" but can't "pull".

Figure 13:
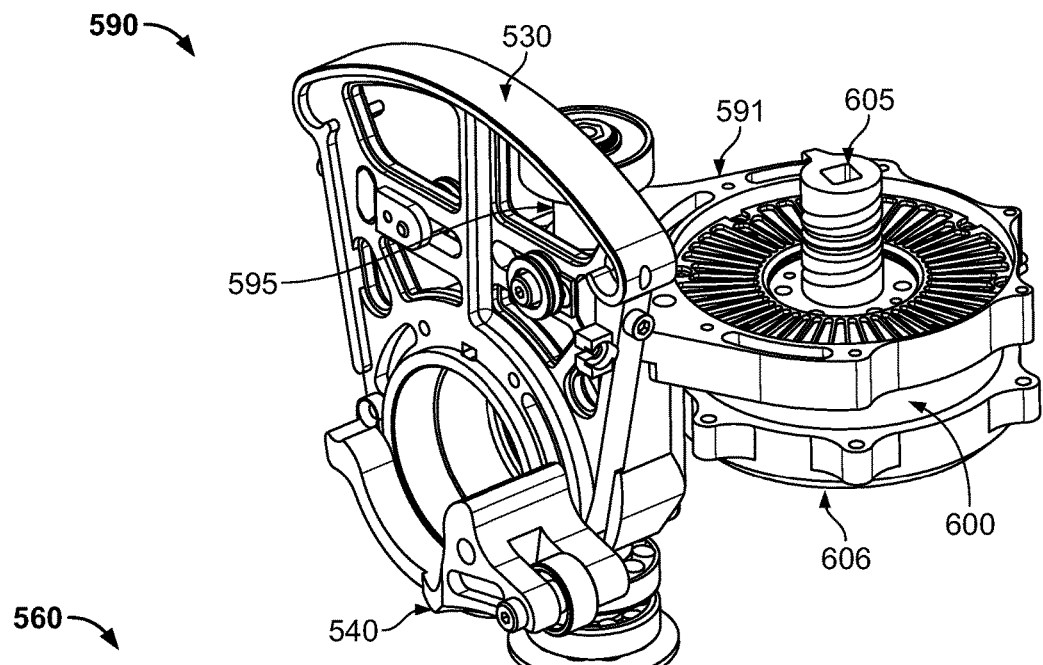
FIG. 13 is an illustration of a hip Z subassembly according to an embodiment of the present disclosure.

Referring again to FIG. 6, the hip subassembly 500 further includes a hip Z subassembly 590. The hip Z subassembly is shown in more detail in FIG. 13. The hip Z subassembly 590 contains the drive system that creates torque for yaw rotation.

The hip Z subassembly 590 includes a hip Z motor subassembly 600 that is functionally similar to the hip X motor subassembly 520 described above. The hip Z bobbin 605 is the input stage to a speed-reducing rope transmission functionally similar to the hip Y pulley subassembly 580 (shown on FIG. 25) and described in detail below. The hip Z pulley subassembly 610 (shown on FIG. 14) is the output stage of this speed-reducing transmission. The hip Z pulley subassembly rotates about the hip Z joint shaft 595. The hip Y subassembly 560 is rigidly coupled to the hip Z pulley subassembly 610. Actuation of the hip Z motor subassembly 600 drives movement of the hip Y subassembly 560 relative to the hip Z subassembly 590, including the hip Z frame 591. A hip Z joint encoder 594 is mounted to the hip Y subassembly 560, and measures the hip Z joint motion about the hip Z joint shaft 595.

Referring again to FIG. 6 (see also FIGS. 8, 9, 14), the hip subassembly 500 further includes a hip Y subassembly 560. The hip Y subassembly 560 contains the drive system that creates torque for pitch rotation. The hip Y subassembly 560 includes a hip Y motor subassembly 570 that is functionally similar to the hip X motor subassembly 520 described above.

Figure 25:
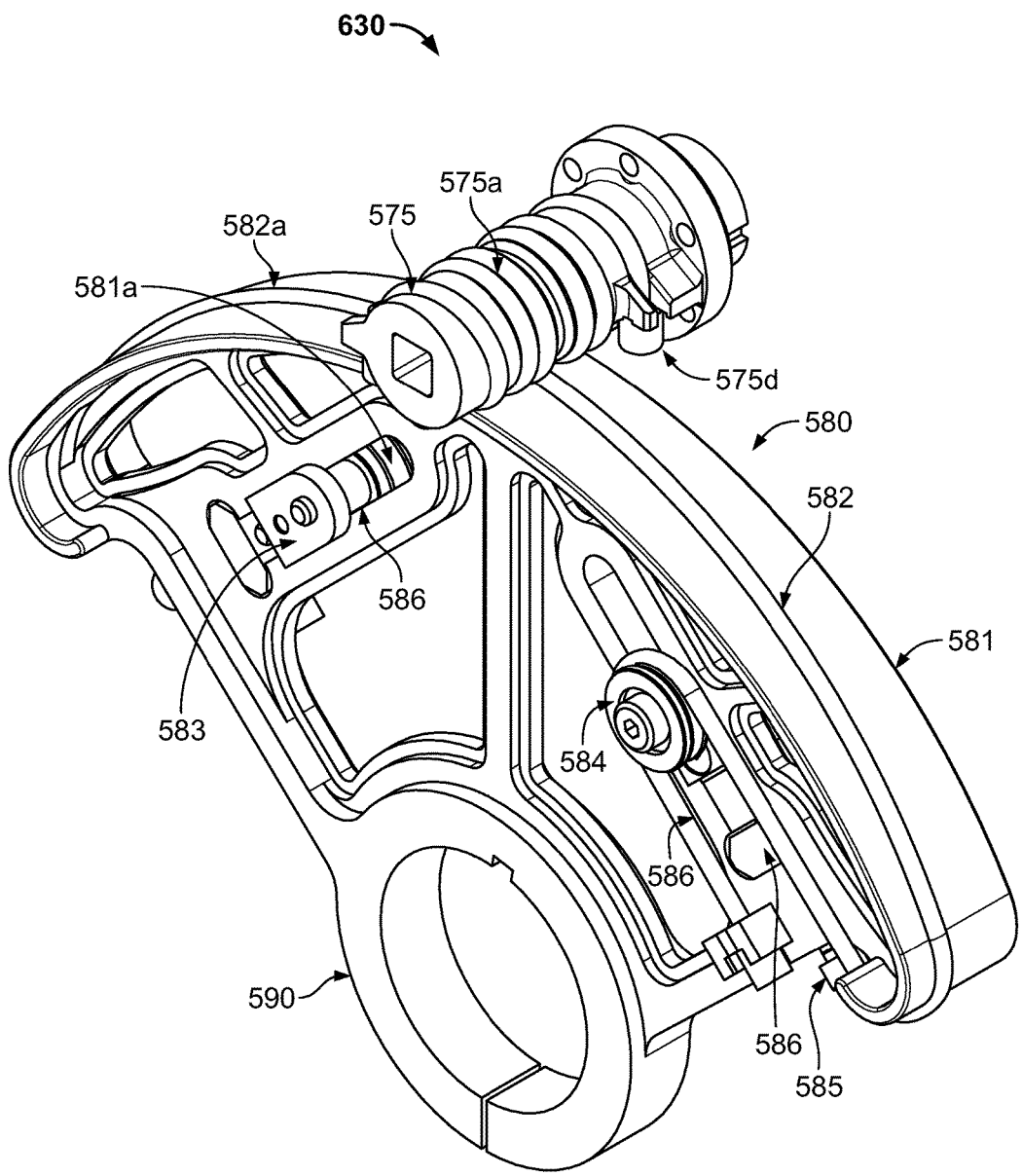
FIG. 25 is an illustration of a hip Y pulley subassembly and hip Y bobbin according to an embodiment of the present disclosure.
Figure 25A:
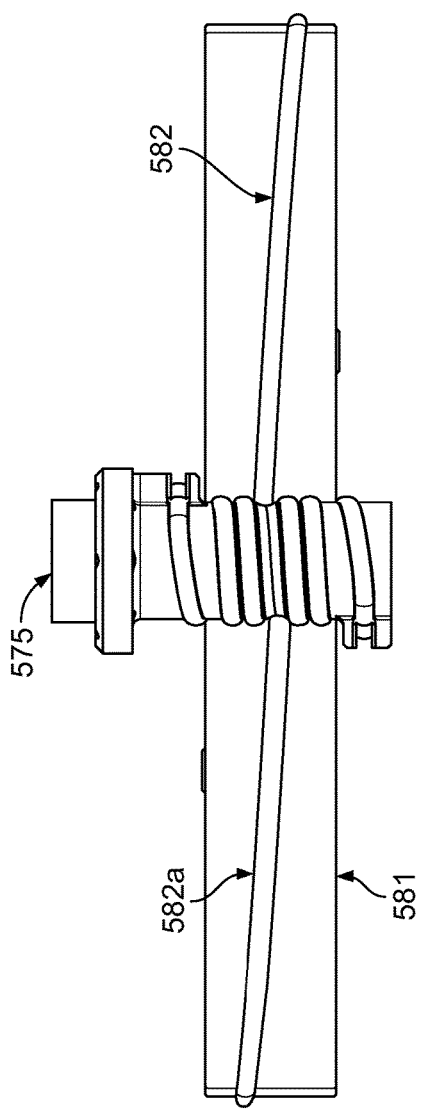
FIG. 25A is a top view of the hip Y pulley subassembly and hip Y bobbin of FIG. 25.

The hip Y bobbin 575 is the input stage to a speed-reducing rope transmission, shown on FIG. 25 and FIG. 25A. A functionally similar arrangement is used on all of the other hip, knee, and ankle joints. The transmission uses cables or ropes 582 and 582a to transfer torque between the bobbin 575 and pulley 581. The speed reduction (and torque amplification) from the bobbin side to the pulley side is determined by the ratio of effective wrap diameters of the rope as it wraps onto the bobbin and pulley. Typical speed reductions used range from 3:1 to 12:1 for a single stage. Certain synthetic ropes (for example braided Vectran) offer apparent advantages relative to more traditional materials such as steel or tungsten cables, including a significantly greater ratio of tensile strength to minimum allowable bend radius, which enables smaller and lighter weight packaging and increased transmission efficiency, while operating silently. Prior implementations using synthetic rope transmissions for robotics have suffered from very short cycle life, due to failure of the ropes. Our design overcomes these limitations by guiding, pre-tensioning, and lubricating the ropes.

Figure 25C:
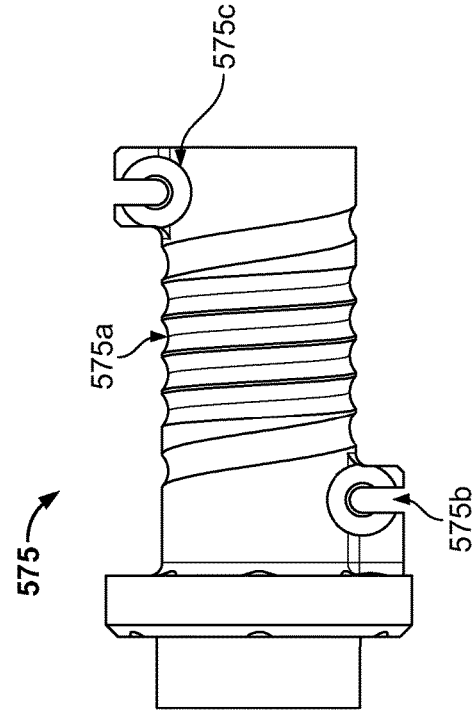
FIG. 25C is a side view of the hip Y bobbin of FIG. 25A.
Figure 25B:
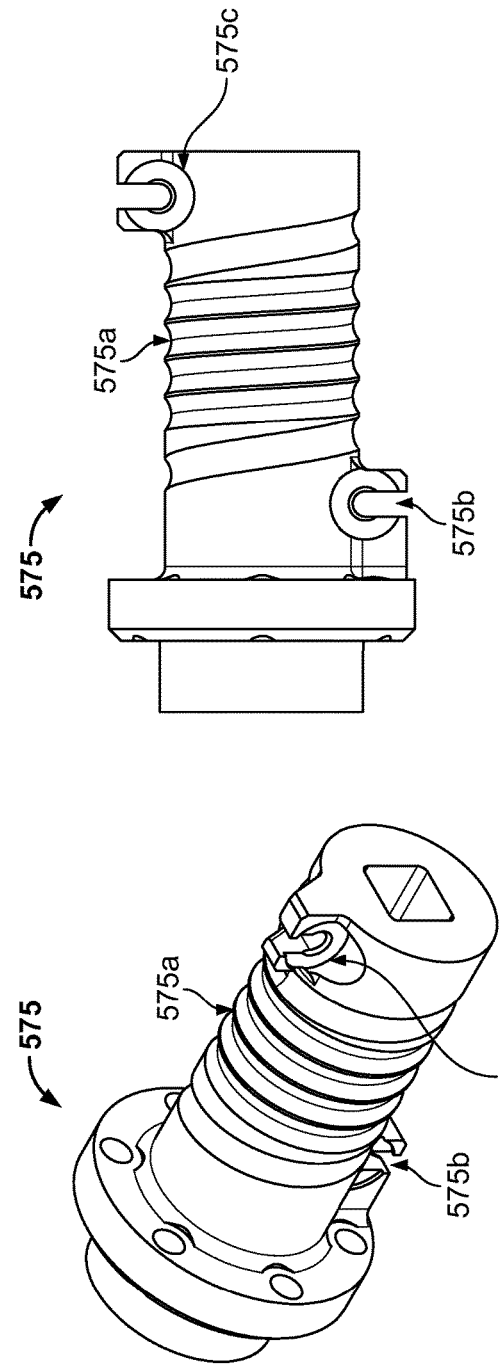
FIG. 25B shows an illustration of a hip Y bobbin according to an embodiment of the disclosure.

The transmission includes two separate or two segments of ropes 582 and 582a, one to carry torque in each direction. One segment is terminated at the inner rope termination feature 575b at one end of the bobbin 575, and the other is terminated at the outer rope termination feature 575c at the other end of the bobbin 575. The segments are secured by a ferrule 575d epoxied to the segment. In another embodiment, other attachment mechanisms or methods may be used to anchor the segments. Bobbin details are shown in FIG. 25B and FIG. 25C. Each rope segment then wraps around a portion of the bobbin, a portion of the pulley, and terminates at the pulley. The bobbin includes a polished spiral channel 575a that guides the rope as it wraps and unwraps. The two rope segments wrap into the same spiral, with no more than one segment or turn of rope occupying any portion of the spiral at any time. The polished spiral prevents successive turns and the two segments 582 and 582a from contacting each other, which can cause friction-induced thermal failures. The surface of the pulley 581 on which the rope rides is also highly polished to reduce friction and avoid rope damage.

Pre-tensioning is critical to prevent "pistoning" or shock loading effects which can cause premature thermal failures due to internal friction resulting from braided elements rubbing against each other. The two rope segments are pre-tensioned by wrapping each around a tensioning wheel 584 that rides on a tensioning trolley 583 that moves in a tension channel 581*a*. A tensioning adjustment screw 585 may be used to adjust the tension on each rope segment. Advancing the screw through a tensioning thread block 586 pushes the trolley 583 and wheel 584 further into the pulley body or pulley 581, increasing tension on the rope 582. The tensioning trolley 583, tensioning wheel 584 and tensioning adjustment screw 585 may be referred to as a tensioning system 586. Finally, adding lubricant (for example grease) to the rope reduces friction, increasing transmission efficiency and extending life by approximately 30%. Lubricant may be added to the exposed surfaces of the rope in situ. Note that hip Y is described in detail in regard to the pulley. A very similar basic structure, though with different sizes, different gear ratios, and different interfaces, is used on all of the other leg joints. The pulley 581 includes a yoke or coupling 590 for transferring the energy of the imparted motion to a drive, for example the thigh subassembly 700 (see FIG. 15), which in this arrangement, is the hip Y pulley subassembly 580. Rather than being a complete circle, the pulley 581 includes only the arc needed to execute the achievable range of joint motion for hip Y. This saves mass and space on the robot.

Figure 14:
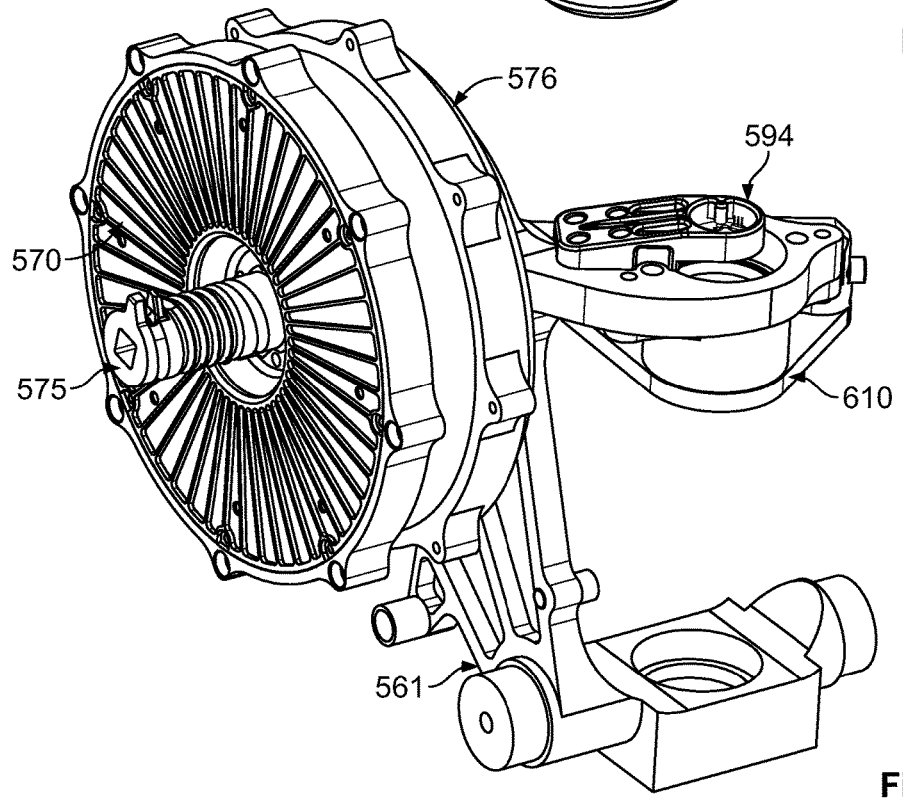
FIG. 14 is an illustration of a hip Y subassembly according to an embodiment of the present disclosure.
Figure 15:
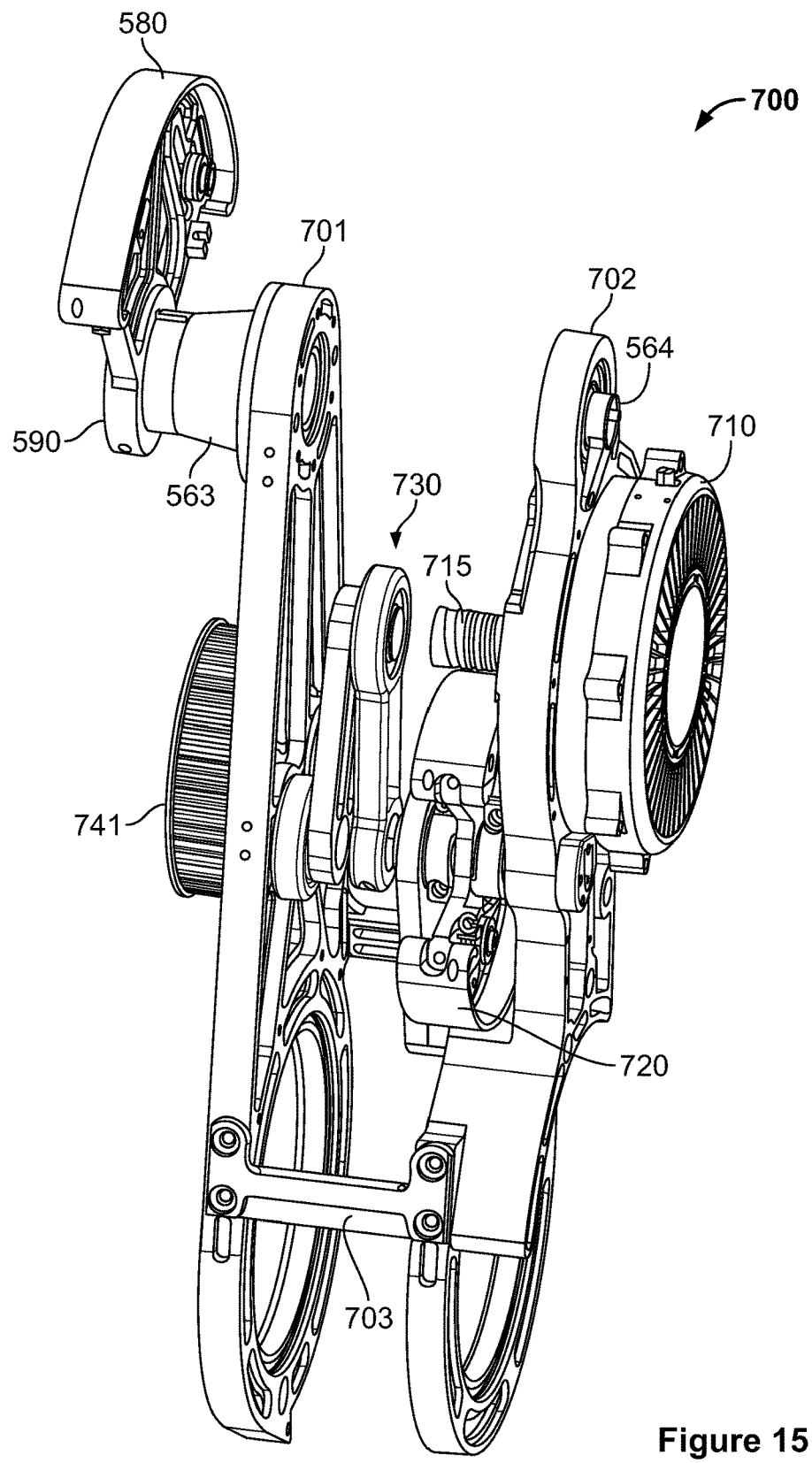
FIG. 15 is an illustration of a thigh subassembly according to an embodiment of the present disclosure.

As can be seen in FIGS. 14 and 15, the hip Y pulley subassembly 580 is the output stage of this speed-reducing transmission. The hip Y pulley subassembly 580 rotates about the hip Y pulley shaft 563. Outer thigh plate 701 is rigidly coupled to the hip Y pulley subassembly 580. Actuation of the hip Y motor subassembly 570 drives movement of the outer thigh plate 701 relative to the hip Y subassembly 560, including the hip Y frame 561. A hip Y joint encoder 564 is mounted to the inner thigh plate 702, which is rigidly coupled to the outer thigh plate 701 through two thigh cross plates 703, and measures the hip Y joint motion about the hip Y pulley shaft 563.

Figure 16:
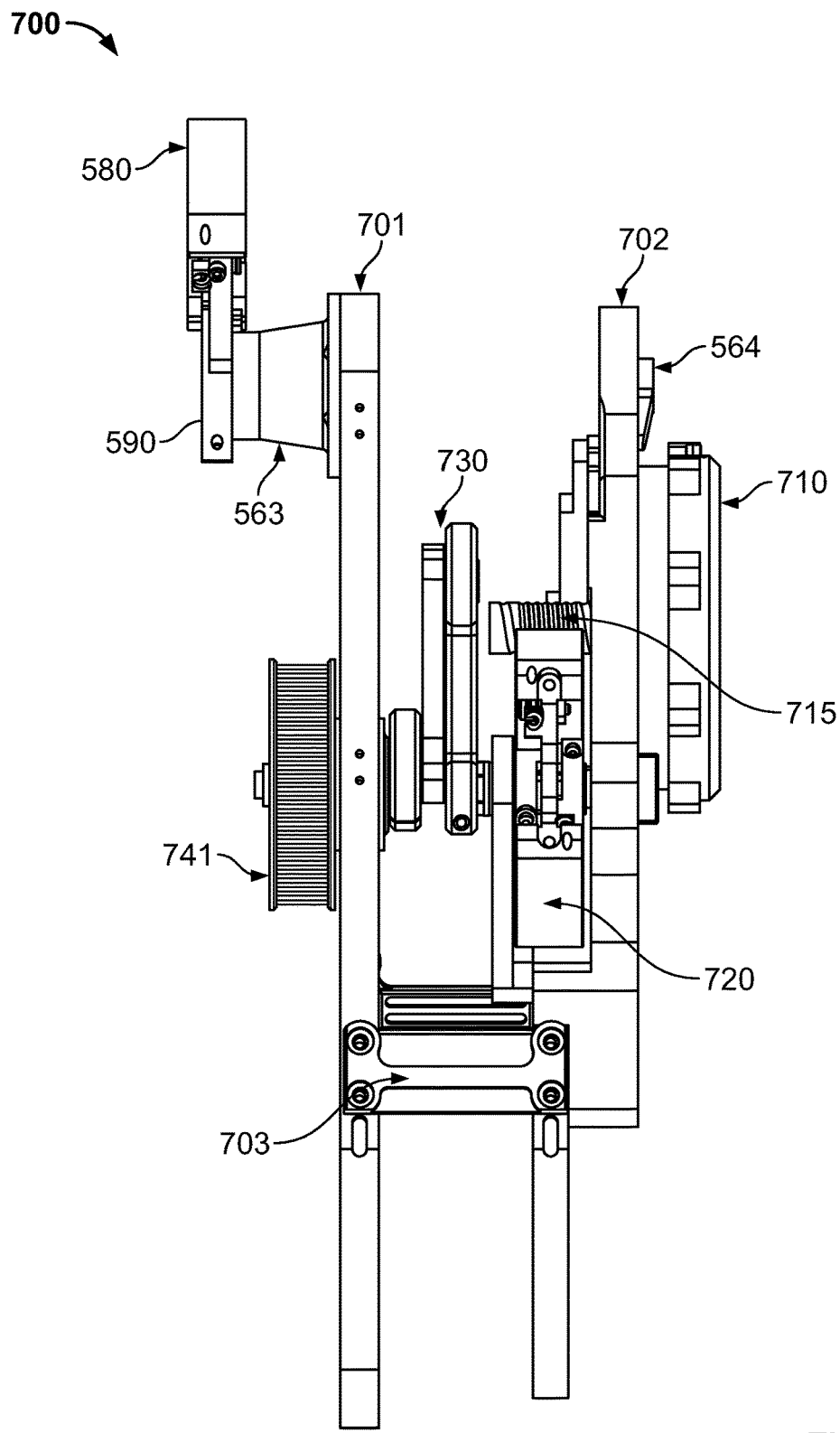
FIG. 16 is a front view of the thigh subassembly of FIG. 15.

FIGS. 15 and 16 show a more detailed view of the thigh subassembly 700. The thigh subassembly 700 contains the drive system that creates torque for knee pitch. As can be seen in FIGS. 15 and 16, the thigh subassembly 700 includes a knee motor subassembly 710 that is functionally similar to the hip X motor subassembly 520 described above.

The knee bobbin 715 is the input stage to a speed-reducing rope transmission functionally similar to the hip Y pulley subassembly 580 shown on FIG. 25 and described in detail above. The knee pulley subassembly 720 is the output stage of this speed-reducing rope transmission. The knee pulley subassembly 720 is rigidly coupled to the input stage of a knee 4-bar transmission subassembly 730.

Figure 16A:
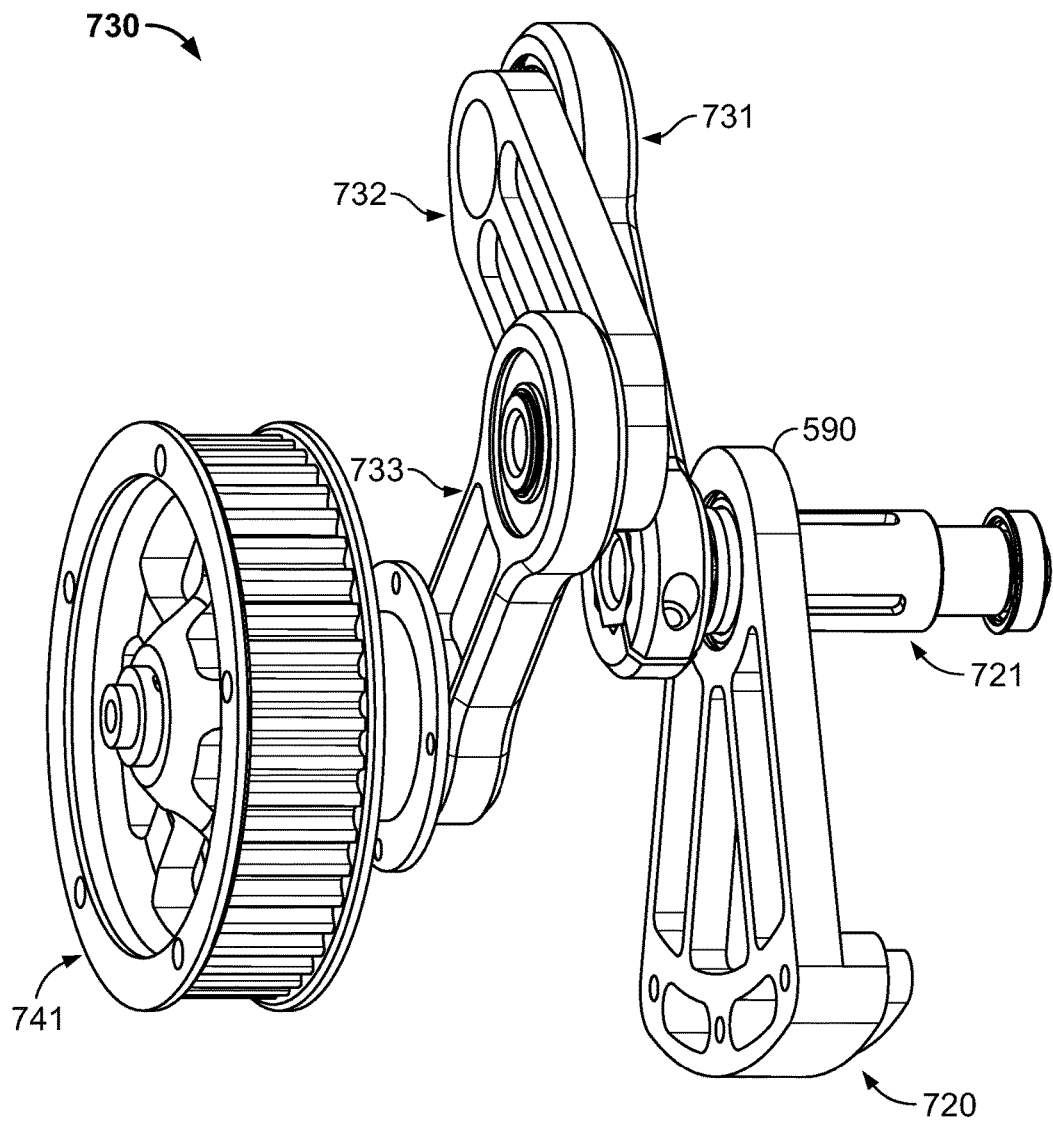
FIG. 16A shows an illustration of a knee 4-bar transmission subassembly according to an embodiment of the disclosure.

FIG. 16A shows the knee 4-bar transmission subassembly 730. The knee 4-bar transmission subassembly 730 acts as a speed-reducing transmission that provides a speed reduction ratio that varies with the angle of the knee joint. The knee 4-bar transmission subassembly 730 consists of an input rotating link 731 that is rigidly coupled to the knee pulley subassembly 720 and to the knee pulley shaft 721, which rotates with respect to the inner thigh plate 702; an intermediate rotating link 732 that moves and rotates in space about two axes (a first axis that is co-linear with one end of the input link 731, and a second axis that is co-linear with one end of the output link 733); and an output rotating link 733 that is rigidly coupled to the knee belt drive input pulley 741 and rotates about a shaft that is fixed to the outer thigh plate 701.

The link lengths are designed such that the ratio of the angular velocity of the output link 733 to the angular velocity of the input link 731 varies (for example from approximately 0.3 to 1.1) depending on the angle of the output link 733 relative to the outer thigh plate 701. The primary function of the knee 4-bar transmission subassembly 730 is to create large ratios of knee joint torques to knee motor torques at certain characteristic knee joint angles where large knee torques are generally required for walking and other legged locomotive behaviors, and smaller ratios of knee joint torques to knee motor torques at certain characteristic knee joint angles where higher speeds and lower torques are generally required for walking and other legged locomotive behaviors. For example, in many cases it is advantageous to increase the transmission ratio as knee angle is increased, as stance knee torques generally increase with knee angle (as the robot becomes more deeply crouched). A larger transmission ratio enables the motor to produce less torque, and therefore use less current (which is approximately proportional to torque). Therefore, as Joule heating losses are proportional to the square of the current (and therefore the square of the torque), Joule heating losses may be reduced, typically by as much as 80-90%, versus a constant transmission ratio. For some walking behaviors, once the knee joint angle reaches a certain critical angle, more energy is saved if the transmission ratio increases up to the critical angle and then decreases for angles greater than this critical angle. This is because for these walking behaviors, the knee angle increases during the swing phase of walking, when high-speed, low-torque knee joint movements are desired. Therefore in many cases it is desirable for the transmission ratio vs. angle curve to have a characteristic with a single "peak" similar to that shown on FIGS. 26A and 26B. In some cases, this characteristic produces near-optimal energy savings across the entire gait cycle.

Figure 16B:
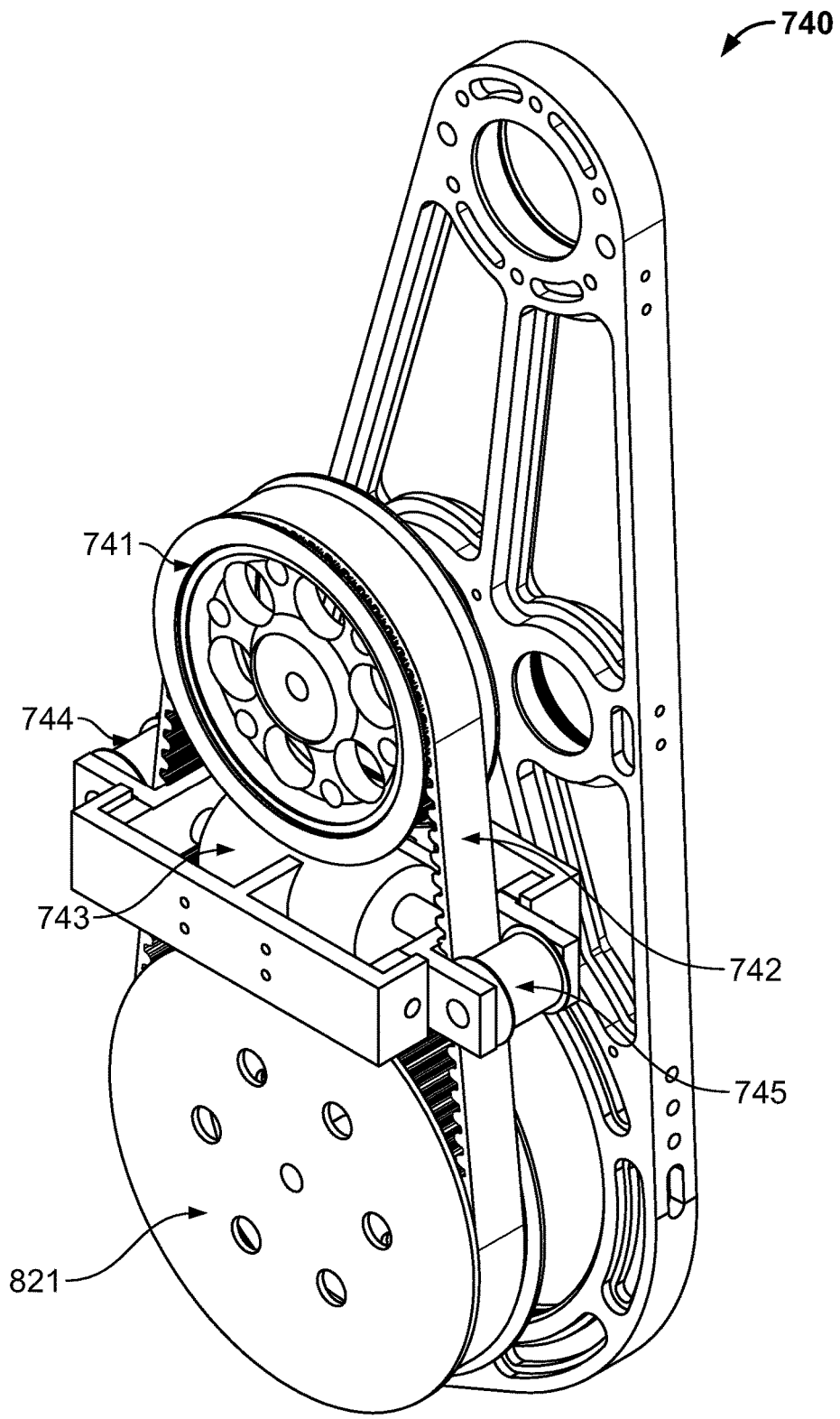
FIG. 16B shows an illustration of a knee belt subassembly according to an embodiment of the disclosure.
Figure 26A:
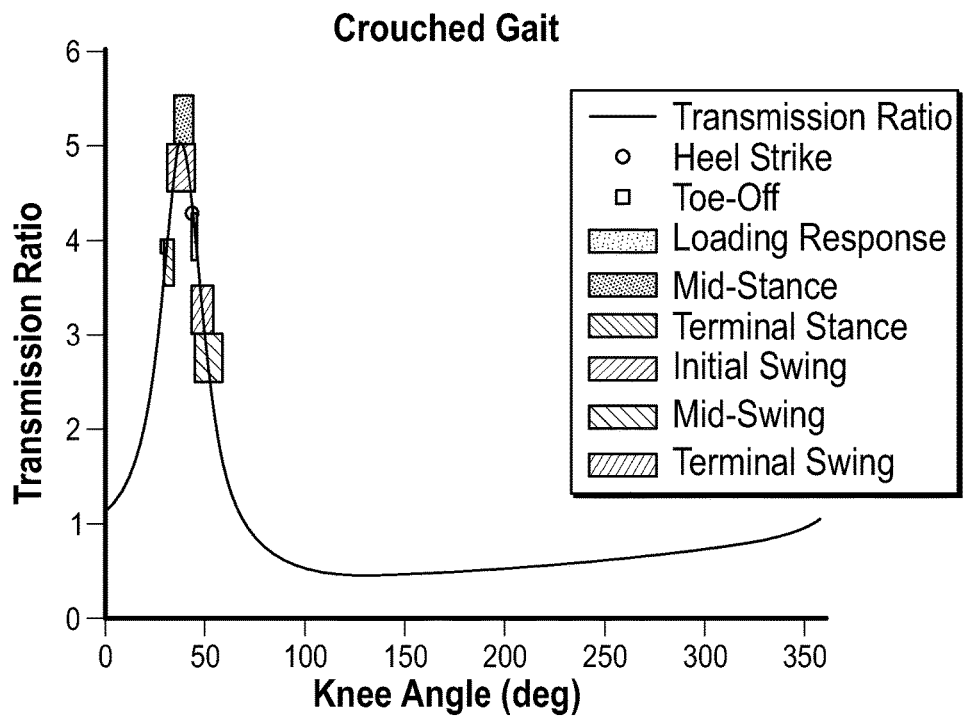
FIG. 26A shows knee 4-bar transmission ratio vs. angle curve for a crouched gait according to an embodiment of the disclosure.
Figure 26B:
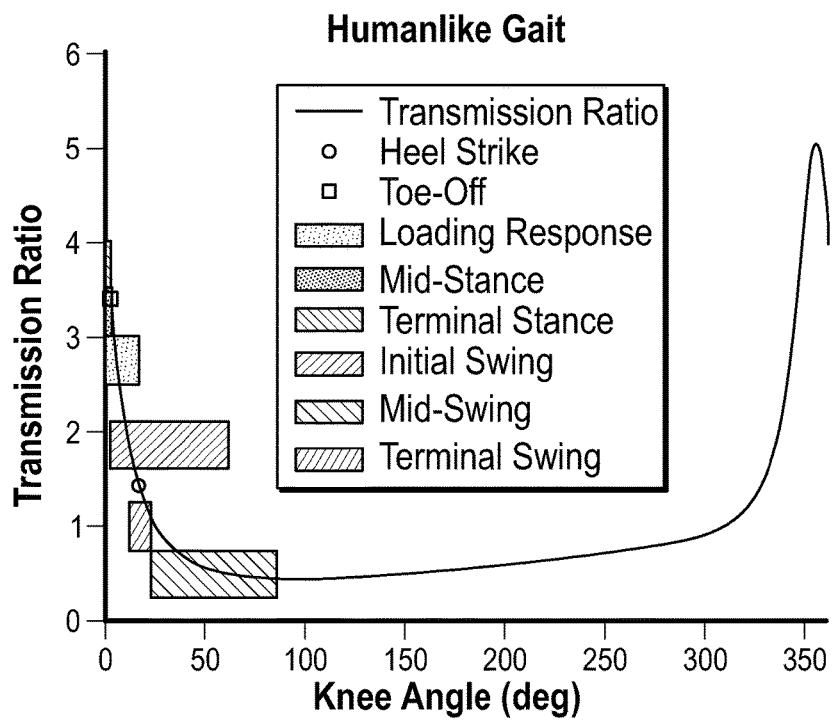
FIG. 26B shows knee 4-bar transmission ratio vs. angle curve for a humanlike gait according to an embodiment of the disclosure.

The knee belt subassembly is shown in FIG. 16B. The output link 733 of the knee 4-bar transmission subassembly 730 is rigidly coupled to the knee belt drive input pulley 741. Rotary motion of the knee belt drive input pulley 741 is coupled to that of the knee belt drive pulley 821 through a power-transmitting belt 742. The purpose of this stage of the transmission is to transfer torque and motion from the axis of the knee belt drive input pulley 741 to the axis of the outer knee joint subassembly 820. This allows the knee motor and four-bar mechanism to be located higher in the thigh, which reduces the moment of inertia of the leg, and also creates space for the ankle motor subassemblies 830, 860 within the knee joint subassembly 810. The clocking of the rotation of the knee belt drive input pulley 741 to the knee belt drive pulley 821 is determined by the indexing of teeth on the belt into both parts. This relative clocking angle determines the knee angles at which particular transmission ratios are generated by the knee 4-bar transmission subassembly 730. Adjusting this relative clocking angle may produce near-optimal behavior for different legged locomotive behaviors. For example, FIGS. 26A and 26B shows two different relative clocking angles (the transmission ratio peak is located at two different angles) for two different walking gaits: one crouched (FIG. 26A), and one more upright and humanlike (FIG. 26B). In one embodiment, the relative clocking angle between the knee belt drive input pulley 741 and the knee belt drive pulley 821 may be adjusted using knee belt adjustment actuator 743 acting upon various structural components (not labeled) as shown in FIG. 16B.

The knee belt adjustment actuator 743 is used to apply and release tension on the belt 742 by moving two rider pulleys 744 and 745 either closer to each other or further apart. In the embodiment shown in FIG. 16B, when the two rider pulleys 744 and 745 are moved closer together, tension is applied to the belt 742 and the teeth of belt 742 are unable to slip with respect to the teeth on the input and output pulleys 741 and 821. When the two rider pulleys 744 and 745 are moved apart, tension is released from the belt 742. With tension released, the belt 741 becomes loose with respect to the input pulley 741 and the drive pulley 821. Therefore it is possible to rotate the knee belt drive pulley 821 with respect to the knee belt drive input pulley 741, with one or both pulleys slipping with respect to the belt 742. This may be done automatically with a maneuver performed by the robot, for example by placing the foot subassembly 1000 in contact with the ground in order to resist motion, and driving the knee belt drive input pulley 741 by actuating the knee motor subassembly 710. The maneuver is stopped when the knee belt drive input pulley 741 and the knee belt drive pulley 821 are at the desired relative angle, and the knee belt adjustment actuator 743 may then be used to bring the rider pulleys 744 and 745 close together, tensioning the belt. In this manner, the relative clocking angle between the knee belt drive input pulley 741 and the knee belt drive pulley 821 may be adjusted for optimal behavior for different gaits, using only actuators that are part of the robot. In a similar embodiment, the adjustment actuator 743 may be used to drive the two rider pulleys 744 and 745 against the belt to cause the belt to bow outwards and detach from the drive pulley 821. Then the same maneuver described above may be used to change the relative clocking angle between the drive pulley 821 and the input pulley 741.

Actuation of the knee motor subassembly 710 drives rotary movement of the shank subassembly 800, including the knee joint subassembly 810, relative to the thigh subassembly 700, through the knee 4-bar transmission subassembly 730 and the knee belt drive input pulley 741.

Figure 17:
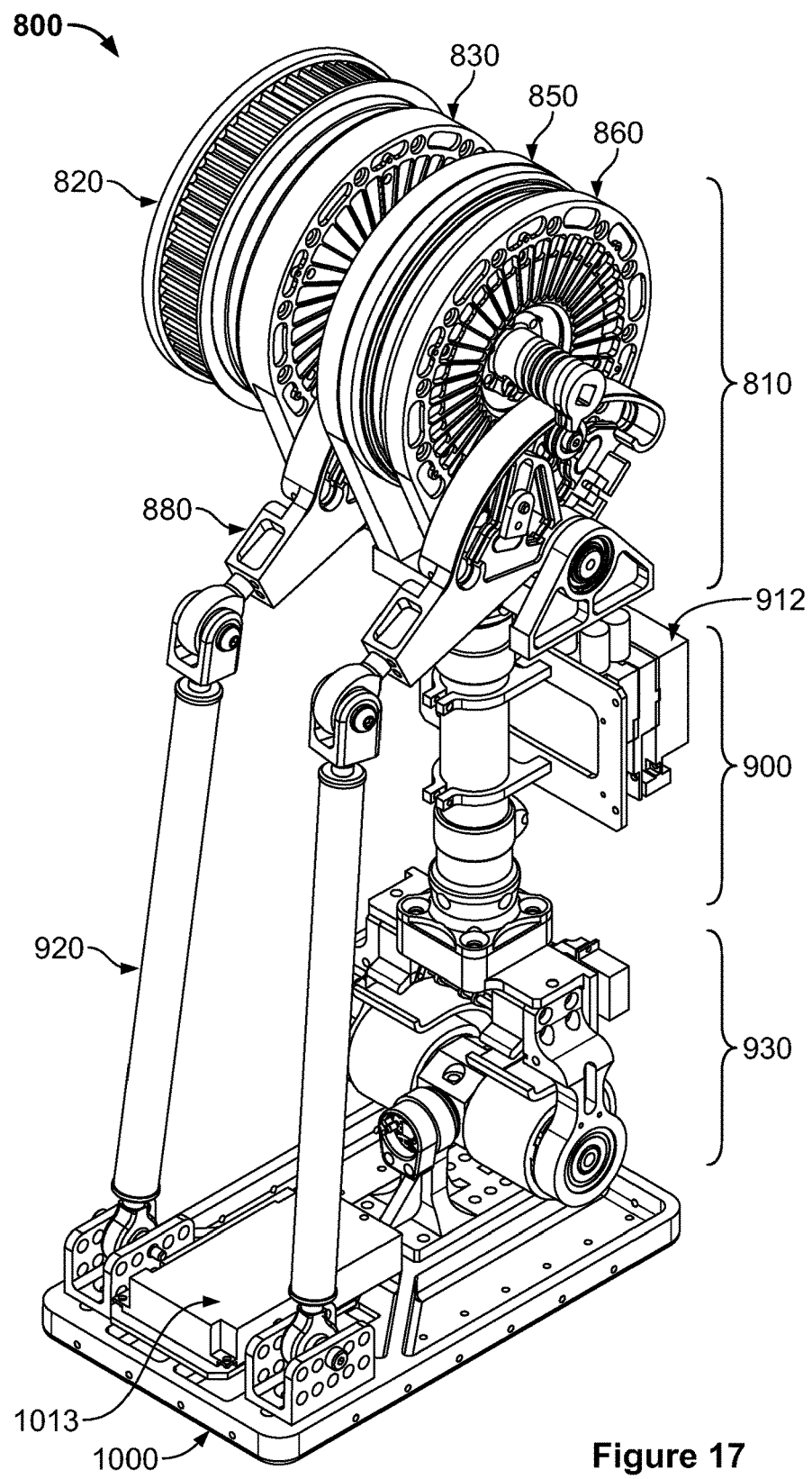
FIG. 17 is an illustration of a shank subassembly according to an embodiment of the present disclosure.
Figure 18:
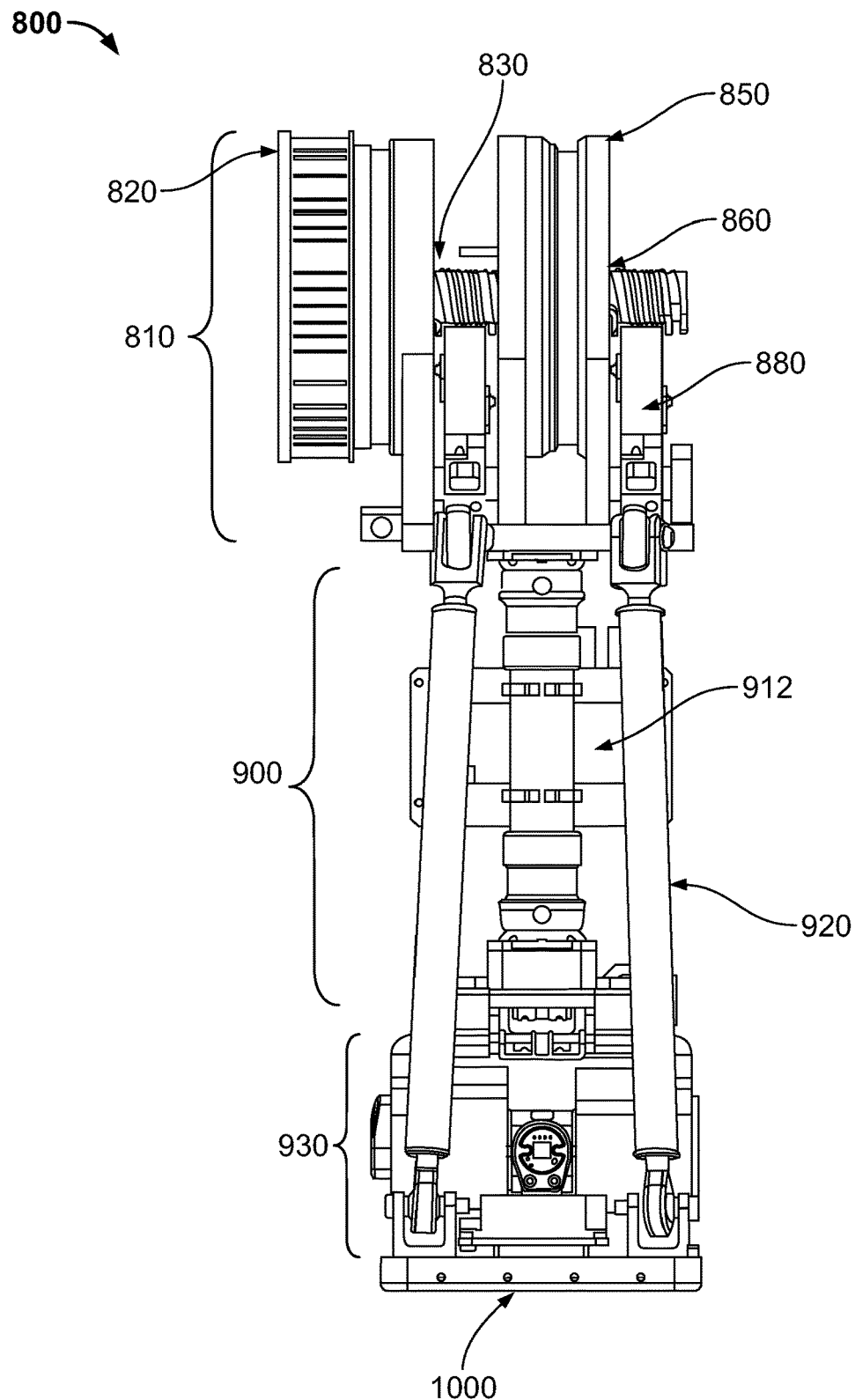
FIG. 18 is a front view of the shank subassembly of FIG. 17.
Figure 19:
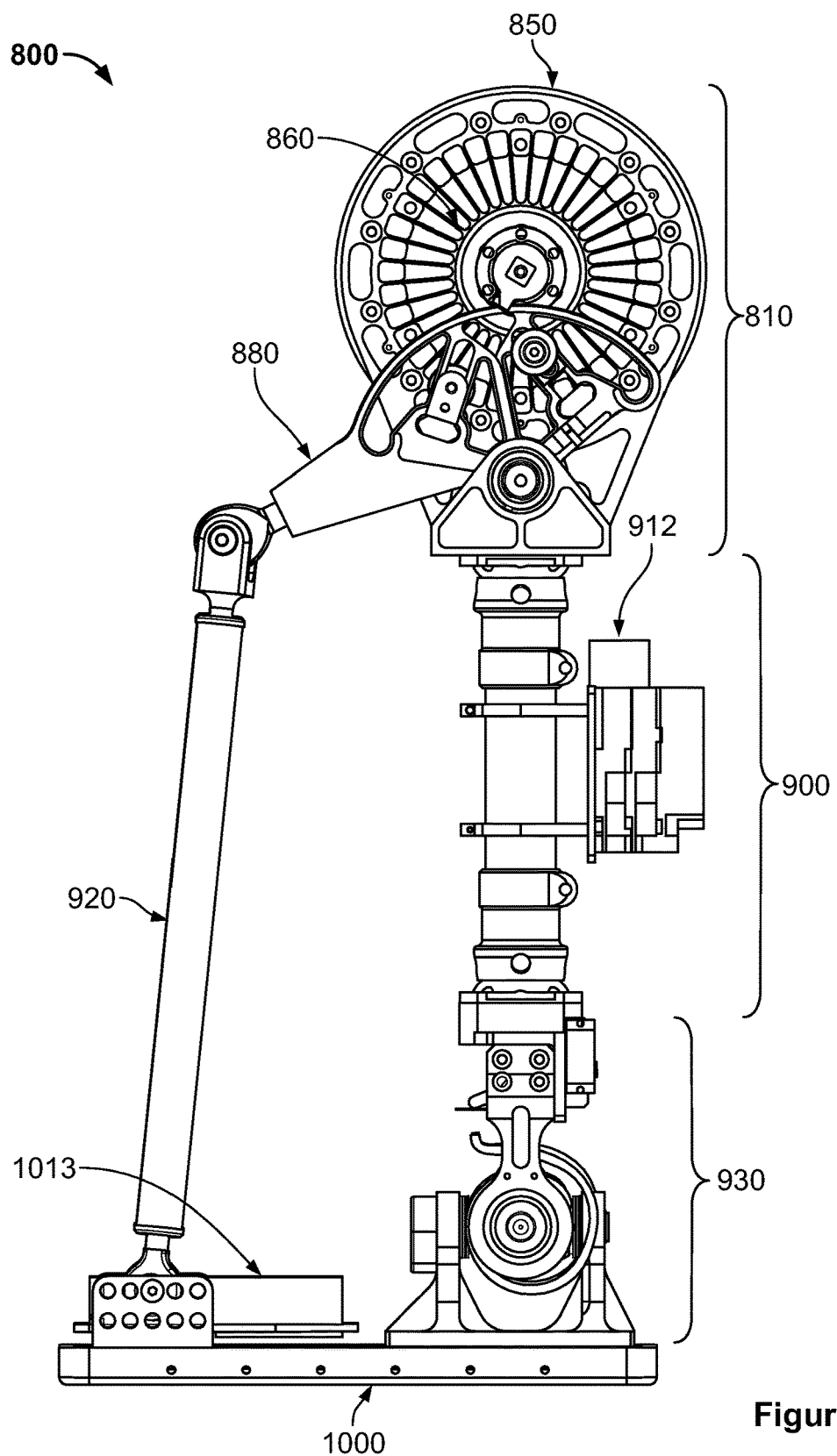
FIG. 19 is a side view of the shank subassembly of FIG. 17.

FIGS. 17-19 show more detailed views of the shank subassembly 800. As can be seen in FIGS. 17-19, the shank subassembly 800 contains the drive system that creates torque for foot pitch and foot roll, through a differential drive system. When the inner ankle motor subassembly 860 and outer ankle motor subassembly 830 both drive in the same direction, the foot rotates in the pitch direction relative to the fixed shank subassembly 900. When the two motors 860 and 830 drive in opposite directions, the foot rotates in the roll direction relative to the fixed shank subassembly 900. As can further be seen in FIGS. 17 and 19, the shank subassembly 800 also includes electronics subassembly 1013 that operates the foot contact sensors 1012 (see FIG. 24).

Figure 20:
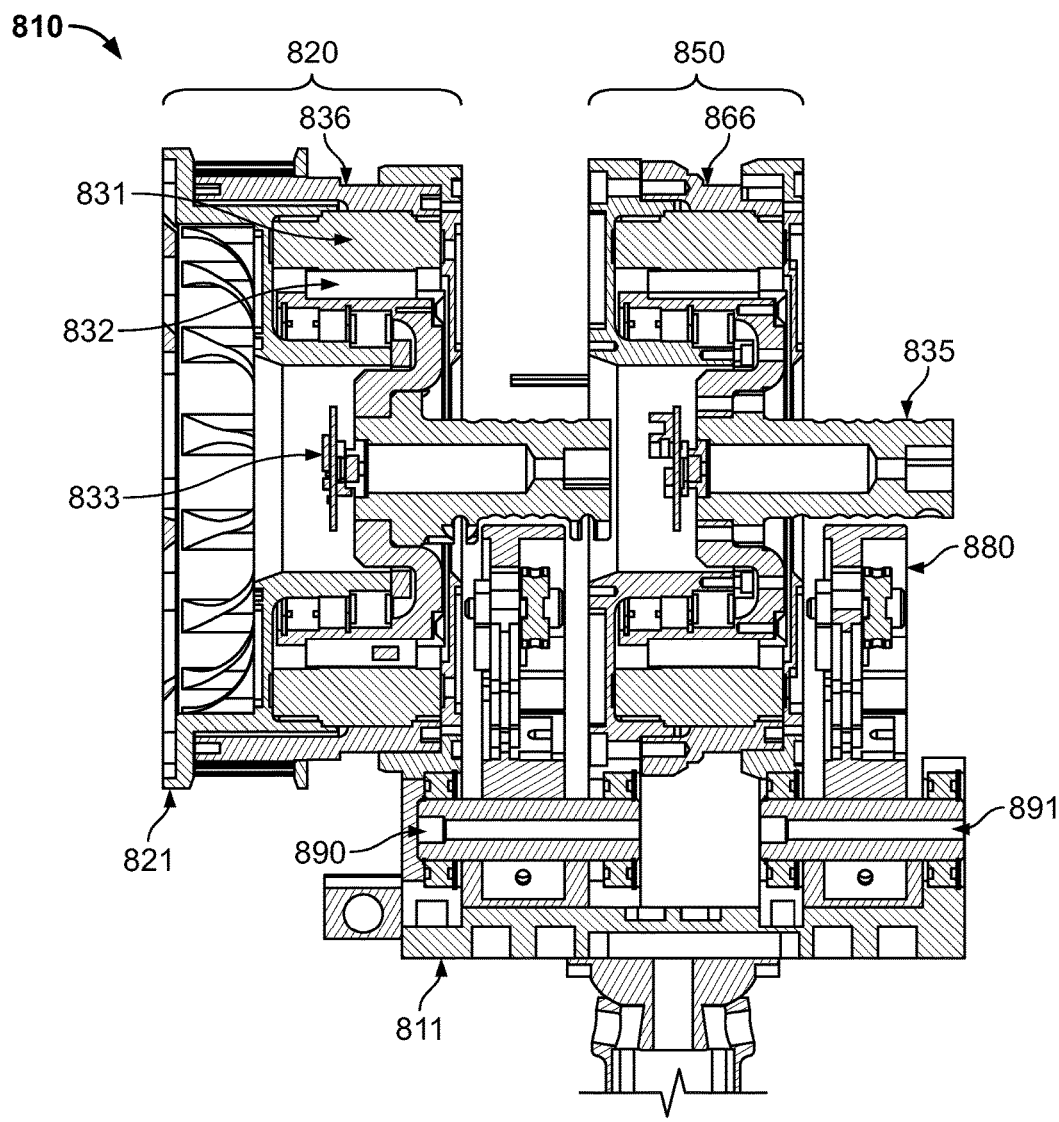
FIG. 20 is a sectioned front view of a knee joint subassembly according to an embodiment of the disclosure.

FIG. 20 shows a more detailed view of the knee joint subassembly 810. As can be seen in FIG. 20, the knee joint subassembly contains the outer and inner ankle motors 830 and 860 that drive motion of the foot through a differential drive system. The inner ankle motor housing 866 and outer ankle motor housing 836 are both rigidly coupled to the knee belt drive pulley 821 and the knee joint frame 811, which is rigidly coupled to the shank subassembly 900; all of these parts move together relative to the thigh subassembly 700 when the knee motor subassembly 710 is actuated.

The outer knee joint subassembly 820 includes an outer ankle motor subassembly 830 that is functionally similar to the hip X motor subassembly 520 described above, and includes a motor stator 831, motor rotor 832, and motor encoder 833 that function as the analogous components in the hip X motor subassembly 520.

The inner knee joint subassembly 850 includes an inner ankle motor subassembly 860 that is functionally similar to the hip X motor subassembly 520 described above. Each motor subassembly includes a bobbin 835 that is rigidly coupled to the motor rotor. The inner and outer ankle motor subassemblies 830 and 860 and the drive systems to which they couple are functionally similar to each other.

The ankle bobbin 835 is the input stage to a speed-reducing rope transmission functionally similar to the hip Y pulley subassembly 580 shown on slide 30 and described in detail above. The ankle pulley subassembly 880 is the output stage of this speed-reducing rope transmission. The ankle pulley subassembly 880 also includes the input link of a four-bar mechanism that drives motion of the foot subassembly 1000 relative to the shank subassembly 900. The ankle pushrod assembly 920, the foot subassembly 1000, and the shank subassembly 900 form the other three bars of this four-bar mechanism. The primary purpose of this four-bar mechanism is to transmit torque from the ankle motors to the two degree-of-freedom joint 936 contained in the ankle subassembly 930, enabling the ankle motors 830 and 860 to be higher in the leg and for leg inertia to be lower than if the ankle motors 830 and 860 were co-located with the ankle joint 936 in the ankle subassembly 930 (shown in more detail in FIG. 21). A secondary purpose of this four-bar mechanism is to provide a variable transmission ratio between the ankle motors 830 and 860 and ankle joint 936. Typically this four-bar is configured to vary the transmission ratio by 30% or less within the anticipated range of motion.

Tensile and compressive forces are transmitted through the ankle pushrod assemblies 920 coupled to the two ankle pulley subassemblies 880. Actuation of the ankle motor subassemblies 830, 860 drives rotary movement of the foot subassembly 1000 relative to the shank subassembly 900. Actuation of the outer ankle motor subassembly 830 and the inner ankle motor subassembly 860 in the same direction drives pitch motion of the foot subassembly 1000. Actuation of the outer ankle motor subassembly 830 and the inner ankle motor subassembly 860 in opposite directions drives roll motion of the foot subassembly 1000. The power and logic electronics that drive the outer and inner ankle motor subassemblies 830, 860 are contained in the ankle motor electronics subassembly 912.

Figure 21:
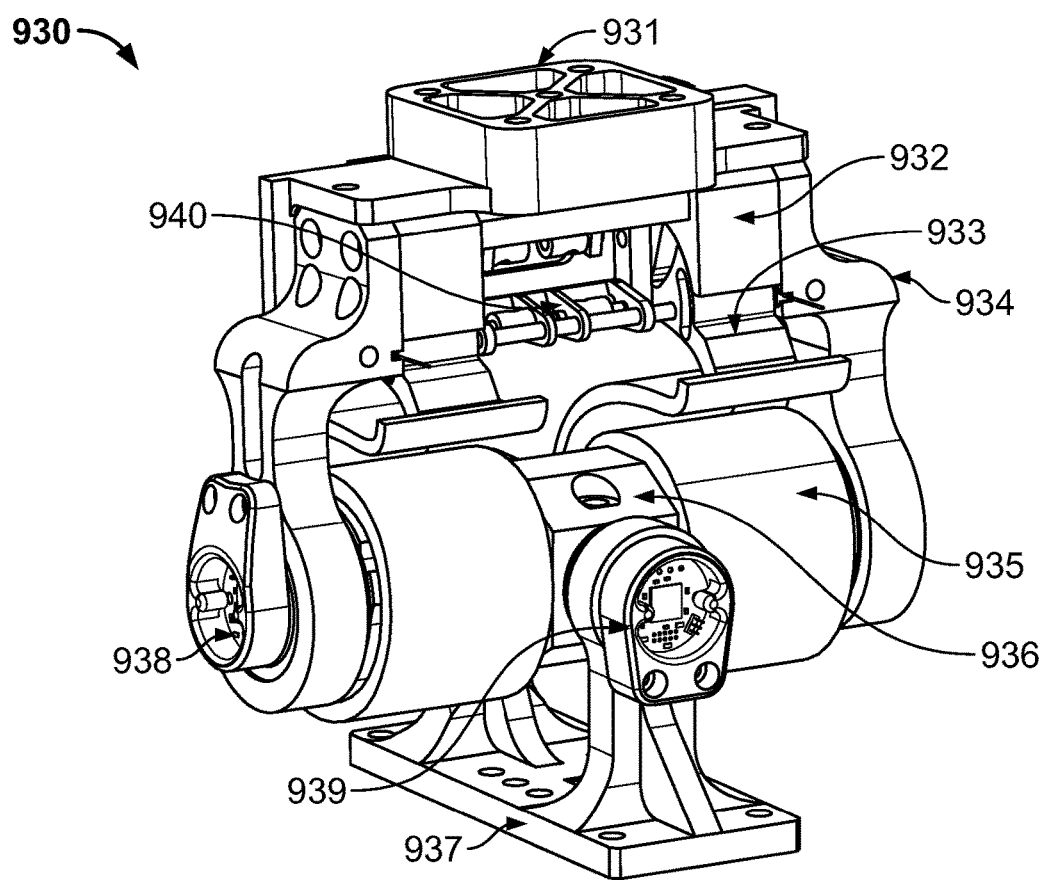
FIG. 21 is an illustration of an ankle subassembly according to an embodiment of the present disclosure.

FIG. 21 shows the ankle subassembly 930. The ankle subassembly 930 supports and enables the two degree-of-freedom relative motion of the foot subassembly 1000 and the shank subassembly 900. As can be seen in FIG. 21, the ankle subassembly 930 includes a universal joint, ankle U-joint 936 that enables rotation in two intersecting axes of rotation, foot pitch and foot roll. Joint motion is measured by the ankle pitch joint encoder 938 and the ankle roll joint encoder 939. The ankle shank plate 931, ankle spring pawl block 932, and ankle pitch joint block 934 are rigidly coupled to the shank subassembly 900. The ankle foot plate 937 is rigidly coupled to the foot subassembly 1000.

The ankle subassembly 930 includes one or more rotary ankle springs 935 that act in parallel with the drive system across the joint in the pitch axis. When the ankle spring pawls 933 are in contact with the ankle springs 935, stress may be developed in the springs, creating a torque that resists pitch motion that brings the front of the foot subassembly 1000 closer to the shank subassembly 900. For some walking and legged locomotive behaviors, energy may be saved by including an Ankle Spring that engages only during certain portions of the gait cycle, for example only during the stance phase of walking but not the swing phase of walking. The ankle subassembly 930 includes an ankle pawl actuation subassembly 940 that enables the pawl 933 to be selectively engaged or disengaged from contact with the spring. If the ankle pawl actuation subassembly 940 is used to drive the ankle spring pawls 933 up and into the ankle spring pawl block 932, the ankle spring pawls 933 do not contact the ankle springs 935 at any joint angle, and stress is not developed in the springs 935. If the pawls 933 are driven down and out of the pawl block 932, they do contact the ankle springs 935 at certain angles, and stress is developed in the springs 935. The ankle pawl actuation subassembly 940 may include an actuator (not shown), for example a rotary servo, that is used to drive the pawls 933 into or out of the ankle spring pawl block 932. Alternatively, the ankle spring pawls 933 may be held in a fixed position in order to always or never be able to contact the ankle springs 935 at certain angles. Adjusting the length or position of the ankle spring pawls 933, or the rotary position of the ankle springs 935 changes the contact angle at which torque begins to be applied by the spring about the joint axis. It may be near-optimal from an energy perspective to adjust this contact angle for different walking gaits or legged locomotive behaviors. In other words, the spring is only active/engaged over a certain portion of the joint's range of motion, not all of it; and the spring only acts in one direction, it just "pushes" but can't "pull".

Figure 22:
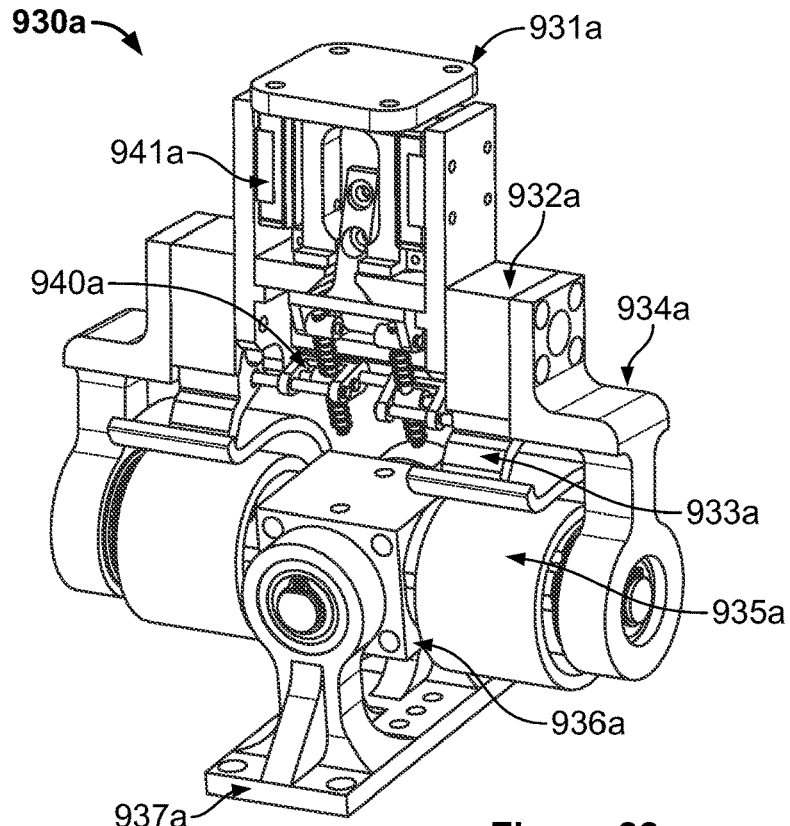
FIG. 22 is an illustration of another embodiment of an ankle subassembly according to the present disclosure.

FIG. 22 shows another embodiment of an ankle Subassembly 930a according to the present disclosure. The ankle subassembly 930a architecture may be used to allow passive engagement and disengagement of the springs without the need for an additional actuator. As can be seen in FIG. 22, the ankle subassembly 930a includes an ankle U-joint 936a, ankle foot plate 937a, ankle springs 935a, ankle pitch joint block 934a, ankle spring pawls 933a, ankle shank plate 931a, and ankle spring pawl block 932a that are functionally similar to those included in ankle subassembly 930. Ankle subassembly 930a also includes an additional linear degree of freedom allowed by the linear bearing 941a. The linear bearing 941a may be spring- or gravity-loaded such that when there is no significant compressive vertical load through the ankle subassembly 930a, as is typical during the swing phase of walking, the ankle spring pawl block 932a is pushed by the spring or gravity to its greatest possible distance from the ankle shank plate 931a. This passively drives the ankle spring pawls 933a upward and into the ankle spring pawl block 932a through the ankle pawl actuation subassembly 940a, such that the pawls 933a will not contact the ankle springs 935a at any joint angle, and spring torque will not be developed. When there is substantial compressive vertical load through the ankle subassembly 930a, as there is during the stance phase of walking due to the robot's weight, the ankle spring pawl block 932a is pushed to its least possible distance from the ankle shank plate 931a. This passively drives the ankle spring pawls 933a downward and out of the ankle spring pawl block 932a through the ankle pawl actuation subassembly 940a, such that the pawls 933a will contact the ankle springs 935a at certain joint angles, providing a parallel torque. The spring that loads the linear bearing 941a may be tuned (by stiffness selection and preload) to actuate the ankle pawl actuation subassembly 940a in a particular range of compressive load in the shank 900, for example approximately 80 Newtons of force.

The ankle pawl actuation assembly 940a may include a lever mechanism that amplifies the motion of the linear bearing 941a into greater motion at the ankle spring pawls 933a. For example, the linear bearing 941a may travel approximately 0.040", while the ankle spring pawls 933a may travel approximately 0.160". The ankle pawl actuation assembly 940a may also be spring-loaded in one or both directions to help the ankle spring pawls 933a rapidly extend and return to their full desired motion, enabling rapid engagement and disengagement during the gait cycle.

Figure 23:
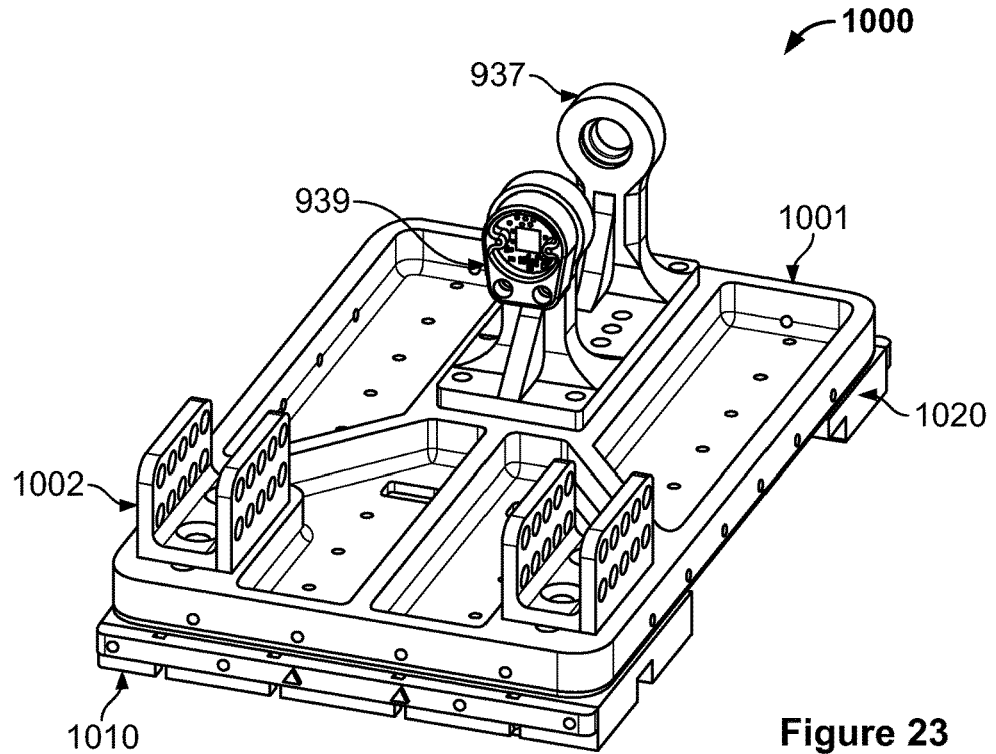
FIG. 23 is an illustration of a foot subassembly according to an embodiment of the present disclosure.
Figure 24:
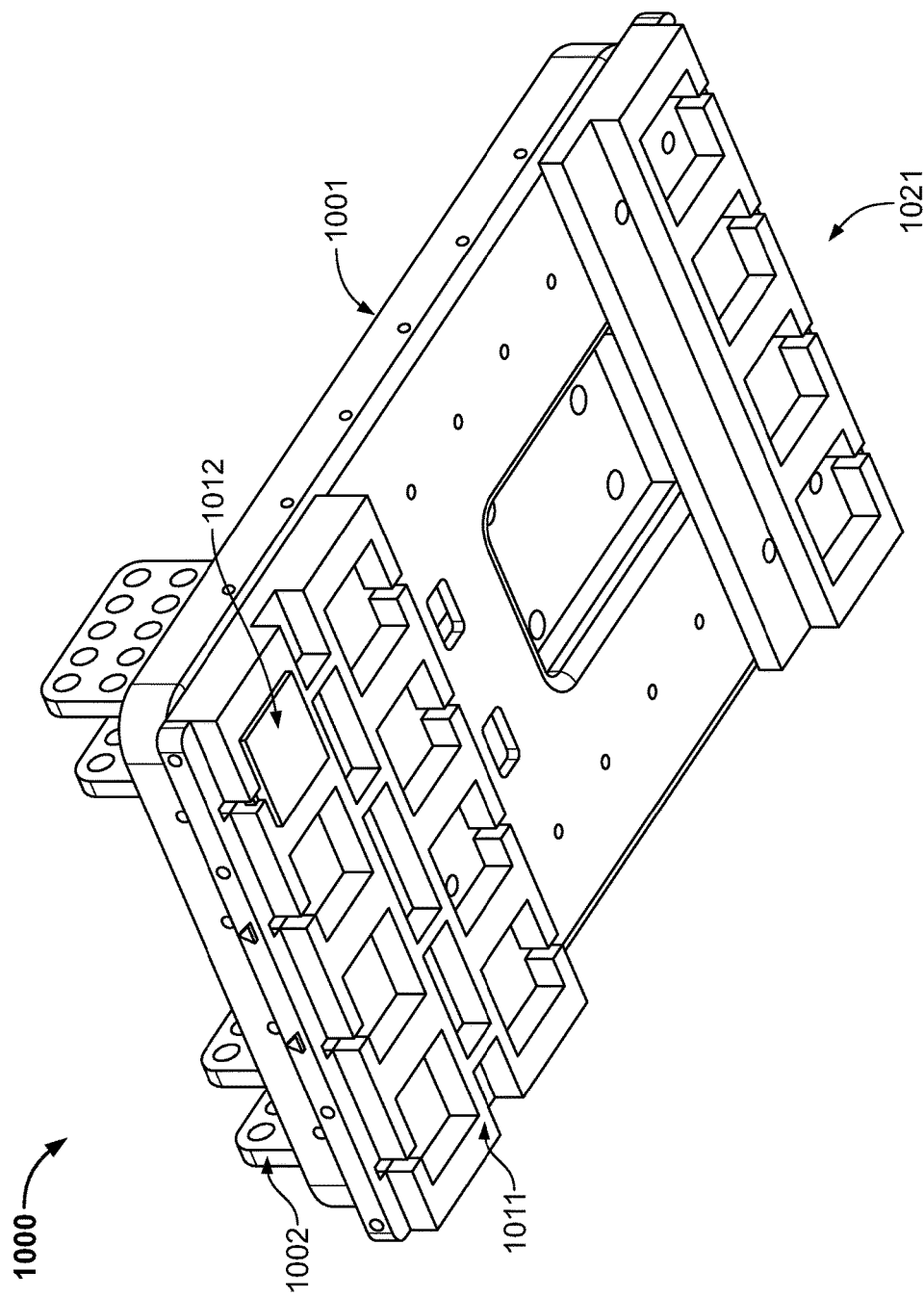
FIG. 24 is a bottom view of the foot subassembly of FIG. 23.

FIGS. 23 and 24 show the foot subassembly 1000. The foot plate 1001 serves as the robot's load-bearing contact surface with the ground. A front foot pad locator plate 1011 and rear foot pad locator plate 1021 are rigidly coupled to the bottom of the foot plate 1001, and contain foot contact sensors 1012. Foot contact sensors 1012 indicate to the robot's control system when the foot subassembly 1000 has reached a threshold contact force in contact with the ground. Foot contact sensors 1012 could be force sensors, reed switches, proximity detectors, or other types of sensors. In one embodiment, a foot contact sensor 1012 consists of a MEMS pressure sensor encapsulated in silicone. Multiple foot contact sensors 1012 are included to accommodate contact between the foot subassembly 1000 and the ground in different portions of the foot subassembly 1000, and to provide redundancy in the event of sensor failure. Electronics 1013 (see FIGS. 17 and 19) read the foot contact sensors 1012.

FIGS. 25 and 25A shows a rope transmission subassembly 630 assembly according to an embodiment of the disclosure, and discussed as pertaining to the hip Y pulley subassembly 580. As can be seen in FIGS. 25 and 25A, the rope transmission subassembly 630 includes a bobbin 575, rope segments 582, 582a and a pulley subassembly 580. As can further be seen in FIG. 25, the rope segments 582 and 582a wrap in opposite directions around the pulley 581 and bobbin 575. One end of rope segment 582a terminates in the termination receptacle 575c on the bobbin 575 (shown on FIGS. 25B and 25C). The other end of segment 582a terminates on the pulley 581 after wrapping around one of the tensioning wheels 584. Similarly, one end of rope segment 582 terminates in the termination receptacle 575b on the bobbin 575, and the other end terminates on the pulley 581 after wrapping around the other tensioning wheel 584. Both rope segments 582 and 582a are pre-tensioned to a bias level by tightening the tensioning screws 585 into the tensioning blocks 586, which pushes the trolleys 583 and tensioning wheels 584 into the body of the pulley 581. Both rope segments are wrapped in the spiral channel 575a on the bobbin 575. There is never more than one rope segment or one turn in any portion of the spiral channel 575a. The spiral channel 575a prevents contact between the two rope segments 582, 582a and between any successive wraps of either rope segment, which is critical to avoiding friction-induced failures and extending rope life. Torque is transmitted from the bobbin 575 to the pulley 581 by applying additional tension on one of the rope segments while simultaneously reducing the bias tension on the other segment. For example, if the motor coupled to the bobbin 575 applies a clockwise (in FIG. 25) torque to the bobbin 575, the tension is increased on rope segment 582 and reduced on segment 582a. This creates a net counterclockwise torque on the pulley 581. Similarly, torque may be transmitted from the bobbin side in the opposite direction by increasing the tension on segment 582a while reducing tension on segment 582. Because tensile loads in the rope segments 582, 582a act at a greater radius on the pulley 581 than on the bobbin 575, the torque on the pulley 581 is greater than the torque on the bobbin 575, by the ratio of the effective wrap radius of the pulley 581 to the effective wrap radius of the bobbin

581. The mechanism works equally well in reverse by the same logic: torque may be transmitted from the pulley 575 to the bobbin 581 by creating differential tension in the rope segments 582 and 582*a* as described above.

FIGS. 25B and 25C show the bobbin 575. One end of each of the rope segments 582 and 582*a* terminates in termination receptacles 575*b* and 575*c*, respectively. Both rope segments 582, 582*a* are guided in the spiral channel 575*a* to protect them from contacting other portions of either rope segment.

FIGS. 26A and 26B show an example of knee 4-bar transmission ratio vs. angle curve optimized for two different gaits. FIG. 26A shows an example of a transmission ratio vs. angle curve approximately optimized for a crouched gait, and FIG. 26B shows an example of a transmission ratio vs. angle curve approximately optimized for a humanlike gait. As can be seen in FIGS. 26A and 26B, in both cases significant input energy may be saved if the transmission ratio of the 4-bar is higher at certain angles than at other angles. In the case of the crouched gait (FIG. 26A), the highest transmission ratio is desired during the mid-stance phase of walking, while it is desired to have lower transmission ratios at both smaller (more straight-legged) and larger (more bent) knee angles than the angle achieved during mid-stance. In the humanlike gait (FIG. 26B), the highest transmission ratios are desired at the smallest (straightest-legged) knee angles, while lower ratios are desired at larger (more bent) knee angles. The transmission ratio vs. angle curves in FIGS. 26A and 26B differ from each other only in the relationship between the transmission ratio peak and knee angle; in other words, the curve in FIG. 26B may be achieved simply by sliding the curve in FIG. 26A to the left by approximately 50 degrees. This shows that with a simple adjustment, in this case, the angle between the output link of the knee 4-bar and the knee angle, the same mechanism can produce near-optimal energy savings for two very different gaits.

Figure 27A:
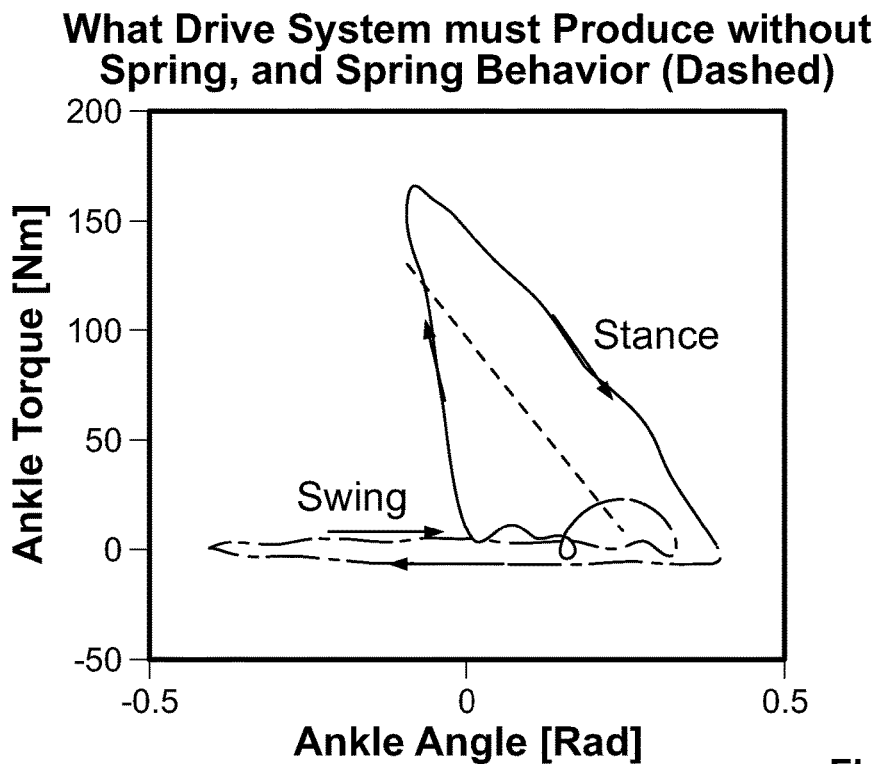
FIG. 27A shows the relationship between ankle torque and ankle angle for drive systems without springs for a walking gait, along with torque-angle behavior of a proposed stance-only spring, according to an embodiment of the disclosure.
Figure 27B:
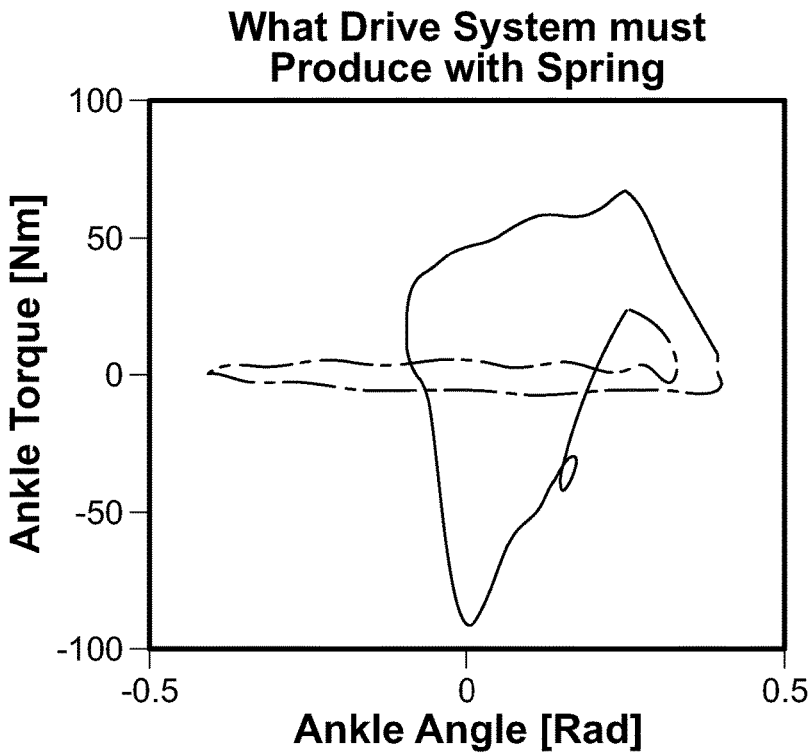
FIG. 27B shows the relationship between ankle torque and ankle angle for a drive system with a springs for a walking gait according to an embodiment of the disclosure.

FIGS. 27A and 27B show two plots of ankle joint pitch torque versus ankle joint pitch angle that illustrate why a selectively-engaged ankle spring may provide significant energy benefits. FIG. 27A indicates the torque-angle behavior of an ankle joint during typical legged locomotive behaviors. The stance phase is shown in solid line, and the swing phase in long and short dashes. The joint traverses similar angles in both stance and swing. In the swing phase, little joint torque is developed, while significant uni-directional torque is developed during stance. If a parallel spring with the torque-angle behavior shown by the dashed line is added only during swing, the resulting torque-angle behavior that must be produced by an active drive system is shown in the right panel. The swing torques are unchanged. The stance torques are shifted. Critically, the peak torques are significantly reduced in the right panel. This is important for energy efficiency because the energy lost due to Joule heating is approximately proportional to the square of the current, and therefore the square of the torque. Therefore reductions in peak torques save considerable energy. If the spring was also active in the swing phase, then the drive system would need to generate significant torques to overcome the spring's torques (it would "fight" the spring), which would mitigate the benefits of the energy saved during the stance phase.

In other embodiments, the locomotion subassembly 350 may be attached to other subassemblies that may include additional or other components as necessitated by the application of the robot.

It should be appreciated that measurements or determinations may be based on field measurements, lab measurements, approximations and/or estimates.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A robot, comprising:
 a locomotion subassembly comprising:
  at least one speed reducing transmission system, comprising:
   a bobbin coupled to a motor;
   a pulley;
   a first cable coupling the bobbin to the pulley such that when the bobbin is rotated, the first cable rotates the pulley in a first direction, and
   a second cable coupling the bobbin the pulley, such that when the bobbin is rotated, the second cable rotates the pulley in a second direction opposite the rotation in the first direction urged by the first cable;
  wherein the bobbin comprises grooves for winding the first and second cables thereupon;
  wherein the locomotion subassembly further comprises:
   a hip adduction spring in parallel with a hip drive system.

2. The robot of claim 1, wherein the locomotion subassembly further comprises:
 a 4-bar transmission subassembly comprising:
  a drive pulley;
  an output rotating link coupled to the drive pulley;
  an intermediate rotating link coupled to the output rotating link;
  an input rotating link coupled to the intermediate rotating link; and
  a pulley subassembly coupled to the input rotating link;
  wherein the pulley subassembly is coupled to a speed reducing transmission system of the at least one speed reducing transmission system.

3. The robot of claim 2, wherein the 4-bar transmission subassembly has an adjustable output angle.

4. The robot of claim 1, wherein the hip adduction spring in parallel with the hip drive system is configured to have an adjustable contact angle.

5. The robot of claim 1, wherein the hip adduction spring in parallel with the hip drive system is configured to have an adjustable equilibrium angle.

6. The robot of claim 1, wherein the locomotion subassembly further comprises:
 an ankle pitch spring in parallel with an ankle drive system.

7. The robot of claim 6, wherein the ankle drive system is configured to have an adjustable contact angle.

8. The robot of claim 6, wherein the ankle pitch spring in parallel with the ankle drive system is configured so that the ankle pitch spring engages only during the stance phase of legged locomotion.

9. A robot, comprising:
a locomotion subassembly comprising:
a 4-bar transmission subassembly comprising:
a drive pulley;
an output rotating link coupled to the drive pulley;
an intermediate rotating link coupled to the output rotating link;
an input rotating link coupled to the intermediate rotating link; and
a pulley subassembly coupled to the input rotating link;
wherein the pulley subassembly is coupled to a speed reducing transmission system.

10. The robot of claim 9, wherein the 4-bar transmission subassembly has an adjustable output angle.

11. The robot of claim 9, wherein the speed reducing transmission system
comprises:
a bobbin coupled to a motor;
a pulley;
a first cable coupling the bobbin to the pulley such that when the bobbin is rotated, the first cable rotates the pulley in a first direction, and
a second cable coupling the bobbin the pulley, such that when the bobbin is rotated, the second cable rotates the pulley in a second direction opposite the rotation in the first direction urged by the first pulley;
wherein the bobbin comprises grooves for winding the first and second cables thereupon.

12. The robot of claim 9, wherein the locomotion subassembly further comprises:
a hip adduction spring in parallel with a hip drive system.

13. The robot of claim 12, wherein the hip adduction spring in parallel with the hip drive system is configured to have an adjustable contact angle.

14. The robot of claim 12, wherein the hip adduction spring in parallel with the hip drive system is configured to have an adjustable equilibrium angle.

15. The robot of claim 9, wherein the locomotion subassembly further comprises:
an ankle pitch spring in parallel with an ankle drive system.

16. The robot of claim 15, wherein the ankle drive system is configured to have an adjustable equilibrium angle.

17. The robot of claim 15, wherein the ankle pitch spring in parallel with the ankle drive system is configured so that the ankle pitch spring engages only during the stance phase of legged locomotion.

18. A system, comprising:
a speed reducing transmission system comprising:
a bobbin coupled to a motor;
a pulley;
a first cable coupling the bobbin to the pulley such that when the bobbin is rotated, the first cable rotates the pulley in a first direction, and
a second cable coupling the bobbin the pulley, such that when the bobbin is rotated, the second cable rotates the pulley in a second direction opposite the rotation in the first direction urged by the first cable;
wherein the bobbin comprises grooves for winding the first and second cables thereupon;
and
a locomotion subassembly comprising:
a 4-bar transmission subassembly comprising:
a drive pulley;
an output rotating link coupled to the drive pulley;
an intermediate rotating link coupled to the output rotating link;
an input rotating link coupled to the intermediate rotating link; and
a pulley subassembly coupled to the input rotating link;
wherein the pulley subassembly is coupled to the speed reducing transmission system.

19. The system of claim 18, further comprising:
a first and a second tensioning system for adjusting the tension on the first and second cables, respectively.

20. The system of claim 18, wherein the pulley further comprises a coupling for transferring rotational energy to a drive system.

* * * * *